United States Patent
Broustis et al.

(10) Patent No.: US 9,450,928 B2
(45) Date of Patent: Sep. 20, 2016

(54) SECURE REGISTRATION OF GROUP OF CLIENTS USING SINGLE REGISTRATION PROCEDURE

(75) Inventors: Ioannis Broustis, Millburn, NJ (US); Ganapathy S. Sundaram, Hillsborough, NJ (US); Harish Viswanathan, Morristown, NJ (US)

(73) Assignee: GEMALTO SA, Meudon (FR)

( * ) Notice: Subject to any disclaimer, the term of this patent is extended or adjusted under 35 U.S.C. 154(b) by 688 days.

(21) Appl. No.: 12/813,153

(22) Filed: Jun. 10, 2010

(65) Prior Publication Data
US 2011/0307694 A1 Dec. 15, 2011

(51) Int. Cl.
*H04L 29/06* (2006.01)
*H04L 9/32* (2006.01)
*H04W 4/00* (2009.01)
(Continued)

(52) U.S. Cl.
CPC .......... *H04L 63/065* (2013.01); *H04L 9/0844* (2013.01); *H04L 9/3271* (2013.01); *H04L 63/0815* (2013.01); *H04L 63/0884* (2013.01); *H04L 63/104* (2013.01); *H04W 4/00* (2013.01); *H04W 4/005* (2013.01); *H04W 12/06* (2013.01); *H04L 2209/80* (2013.01)

(58) Field of Classification Search
CPC . H04L 9/3271; H04L 63/0869; H04L 17/26; H04L 47/41; H04L 1/1621; H04L 47/827; H04L 67/2833; H04L 69/26; H04L 29/08765; G06F 2221/2101; G06F 17/30412; G06F 17/30489
USPC ...................................... 713/163, 169; 726/5
See application file for complete search history.

(56) References Cited

U.S. PATENT DOCUMENTS 7,123,719 B2 * 10/2006 Sowa et al. .................... 380/247
7,194,628 B1 * 3/2007 Guthery .................. H04L 9/085
713/168

(Continued)

FOREIGN PATENT DOCUMENTS

JP       2000509590 A       7/2000
JP       2003318896 A       11/2003
(Continued)

OTHER PUBLICATIONS

W. Simpson, "PPP Challenge Handshake Authentication Protocol (CHAP)," Network Working Group, RFC 1994, Aug. 1996, 14 pages.

(Continued)

*Primary Examiner* — Krista Zele
*Assistant Examiner* — Tariq Najee-Ullah
(74) *Attorney, Agent, or Firm* — Ryan, Mason & Lewis, LLP

(57) ABSTRACT

Automated secure registration techniques for communication devices are provided which address the problem of allowing multiple clients to gain access to one system, and thus provide a solution to the "reverse single sign-on" problem. For example, a method for registering a group of two or more communication devices in a communication network comprises the following steps. A group challenge message is sent from a network device to the group of two or more communication devices. The network device receives one or more response messages to the group challenge respectively from one or more of the group of two or more communication devices, wherein the response message from each of the responding communication devices in the group comprises a group credential corresponding to the group.

34 Claims, 11 Drawing Sheets

(51) Int. Cl.
H04W 12/06 (2009.01)
H04L 9/08 (2006.01)

(56) References Cited

U.S. PATENT DOCUMENTS

| | | | | |
|---|---|---|---|---|
| 7,917,541 | B2* | 3/2011 | Yuan | 707/802 |
| 8,060,741 | B2* | 11/2011 | Wang et al. | 713/155 |
| 2004/0047348 | A1* | 3/2004 | O'Neill | H04L 63/0892 370/389 |
| 2004/0073814 | A1* | 4/2004 | Miyazaki et al. | 713/202 |
| 2004/0205105 | A1* | 10/2004 | Larsson et al. | 709/200 |
| 2005/0257260 | A1 | 11/2005 | Lenoir et al. | |
| 2006/0013398 | A1* | 1/2006 | Halasz et al. | 380/273 |
| 2006/0075248 | A1 | 4/2006 | Westhoff et al. | |
| 2007/0070959 | A1* | 3/2007 | Almeroth et al. | 370/338 |
| 2007/0101141 | A1* | 5/2007 | Sowa et al. | 713/171 |
| 2007/0160017 | A1* | 7/2007 | Meier et al. | 370/338 |
| 2008/0013737 | A1* | 1/2008 | Sowa et al. | 380/278 |
| 2008/0013740 | A1* | 1/2008 | Sowa et al. | 380/286 |
| 2008/0162927 | A1* | 7/2008 | Wang et al. | 713/155 |
| 2008/0301776 | A1* | 12/2008 | Weatherford | 726/3 |
| 2009/0049196 | A1* | 2/2009 | Smith et al. | 709/245 |
| 2009/0083833 | A1* | 3/2009 | Ziola et al. | 726/2 |
| 2009/0086973 | A1* | 4/2009 | Buddhikot et al. | 380/273 |
| 2009/0248712 | A1* | 10/2009 | Yuan | 707/100 |
| 2009/0327443 | A1* | 12/2009 | Pawar et al. | 709/207 |
| 2010/0157894 | A1* | 6/2010 | Park et al. | 370/328 |
| 2011/0016321 | A1* | 1/2011 | Sundaram et al. | 713/171 |
| 2011/0131663 | A1* | 6/2011 | Kaikuranta | G06F 3/0486 726/28 |

FOREIGN PATENT DOCUMENTS

| | | |
|---|---|---|
| JP | 2004054905 A | 2/2004 |
| JP | 2004242210 A | 8/2004 |
| JP | 2005309590 A | 11/2005 |
| JP | 2006109413 A | 4/2006 |
| JP | 2009027513 A | 2/2009 |
| JP | 2010068032 A | 3/2010 |
| JP | 2010183327 A | 8/2010 |
| JP | 2011154410 A | 8/2011 |
| KR | 1020050013583 A | 2/2005 |
| WO | 2009118800 A1 | 10/2009 |
| WO | 2009118801 A1 | 10/2009 |
| WO | 2010061561 A1 | 6/2010 |
| WO | PCT/US2011/039243 | 10/2011 |

OTHER PUBLICATIONS

B. Lloyd, "PPP Authentication Protocols," Network Working Group, RFC 1334, Oct. 1992, 19 pages.
European Telecommunications Standards Institute, GSM Technical Specification GSM 03.20 (ETS 300 534): Digital Cellular Telecommunication System (Phase 2); Security Related Network Functions. Aug. 1997, 51 pages.
3GPP TS 33.102. Technical Specification Group Services and System Aspects; 3G Security; Security Architecture (Release 9), Dec. 2009, 71 pages.
B. Aboba et al., "PPP EAP TLS Authentication Protocol," Network Working Group, RFC 2716, Oct. 1999, 28 pages.
R. Cox et al., "Security in Plan 9," Proceedings of the 11th USENIX Security Symposium, Aug. 2002, 15 pages, California.
3GPP TS 33.401. Technical Specification Group Services and System Aspects; 3GPP System Architecture Evolution (SAE); Security Architecture (Release 9), Jun. 2008, 45 pages.
B. Handley, "Resource-Efficient Anonymous Group Identification," Financial Cryptography, 4th International Conference FC, 2001, pp. 295-312, Anguilla, British West Indies.
S. Gohil et al., "Attacks on Homage Anonymous Group Authentication Protocol," Technical Report OUCS-2004-16, Department of Computer Science, University of Otago, Sep. 2004, 18 pages.
E. Jaulmes et al., "On the Security of Homage Group Authentication Protocol," Springer-Verlag, FC 2001, LNCS 2339, 2002, pp. 106-116.
G. Hanaoka et al., "Unconditionally Secure Anonymous Encryption and Group Authentication," Oxford University Press, Dec. 2005, 12 pages.
L.A. Martucci et al., "A Lightweight Distributed Group Authentication Mechanism," Proceedings of the 4th International Network Conference, INC. Jul. 2004, 8 pages.
A. Nosseir et al., "Question-Based Group Authentication," Proceedings of the 18th Australia Conference on Computer-Human Interaction: Design: Activities, Artifacts and Environments, Nov. 2006, 7 pages.
P. Adusumilli et al., "DGKD: Distributed Group Key Distribution with Authentication Capability," Proceedings of the 2005 IEEE Workshop on Information Assurance and Security, United States Military Academy, Jun. 2005, pp. 286-293.
S. Kent et al., "Security Architecture for the Internet Protocol," Network Working Group, RFC 2401, Nov. 1998, 75 pages.
S. Teofili et al., "User Plane Security Alternatives in the 3G Evolved Multimedia Broadcast Multicast Service (e-MBMS)," Security and Communication Networks, vol. 1, Issue 6, Nov. 2008, pp. 473-485.
3GPP TS 22.368. Technical Specification Group Services and System Aspects; Service Requirements for Machine Type Communications (MTC); Stage 1 (Release 10), Jun. 2010, 25 pages.
ZigBee Alliance. http://www.zigbee.org, 2 pages.
U. Blumenthal et al., "Pre-Shared Key (PSK) Ciphersuites with Null Encryption for Transport Layer Security (TLS)," Network Working Group, RFC 4785, Jan. 2007, 6 pages.
J. Arkko et al., "Extensible Authentication Protocol Method for 3rd Generation Authentication and Key Agreement (EAP-AKA)," Jan. 2006, 89 pages.
China Mobile, "M2M Group Authentication," 3rd Generation Partnership Program (3GPP), Mobile Competence Centre, Apr. 2010, 10 pages.

* cited by examiner

100

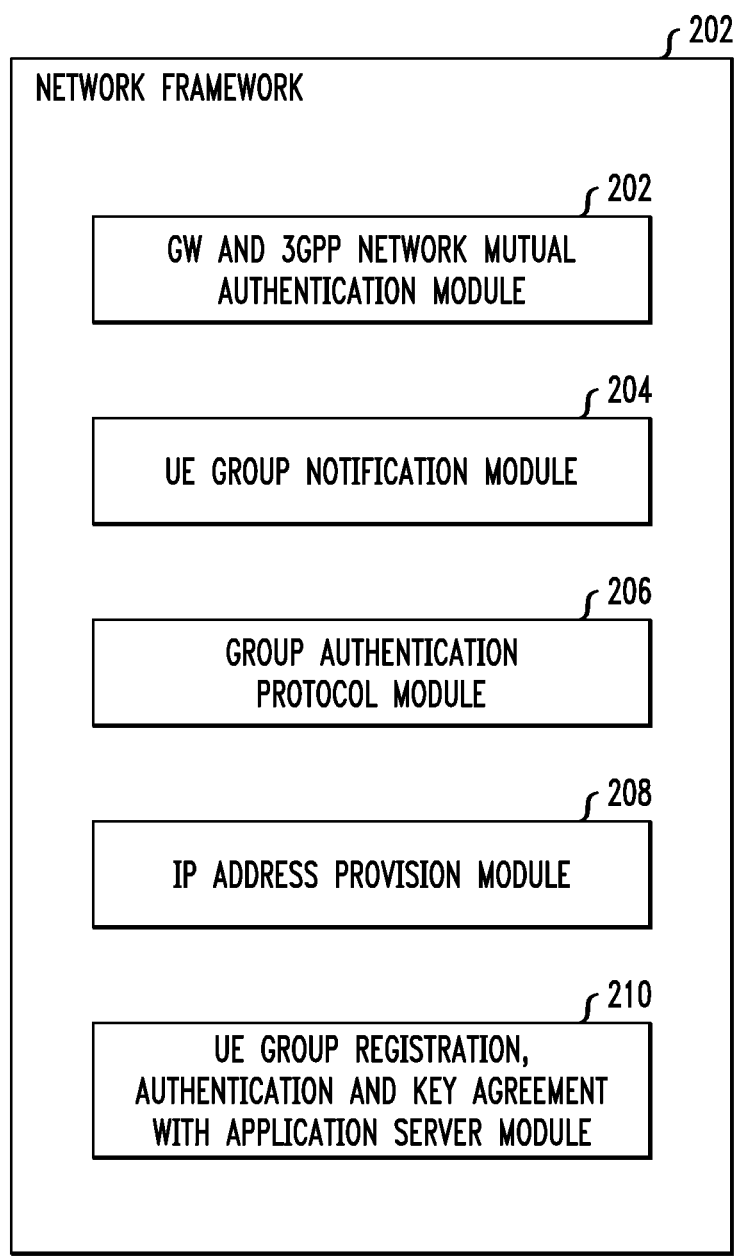

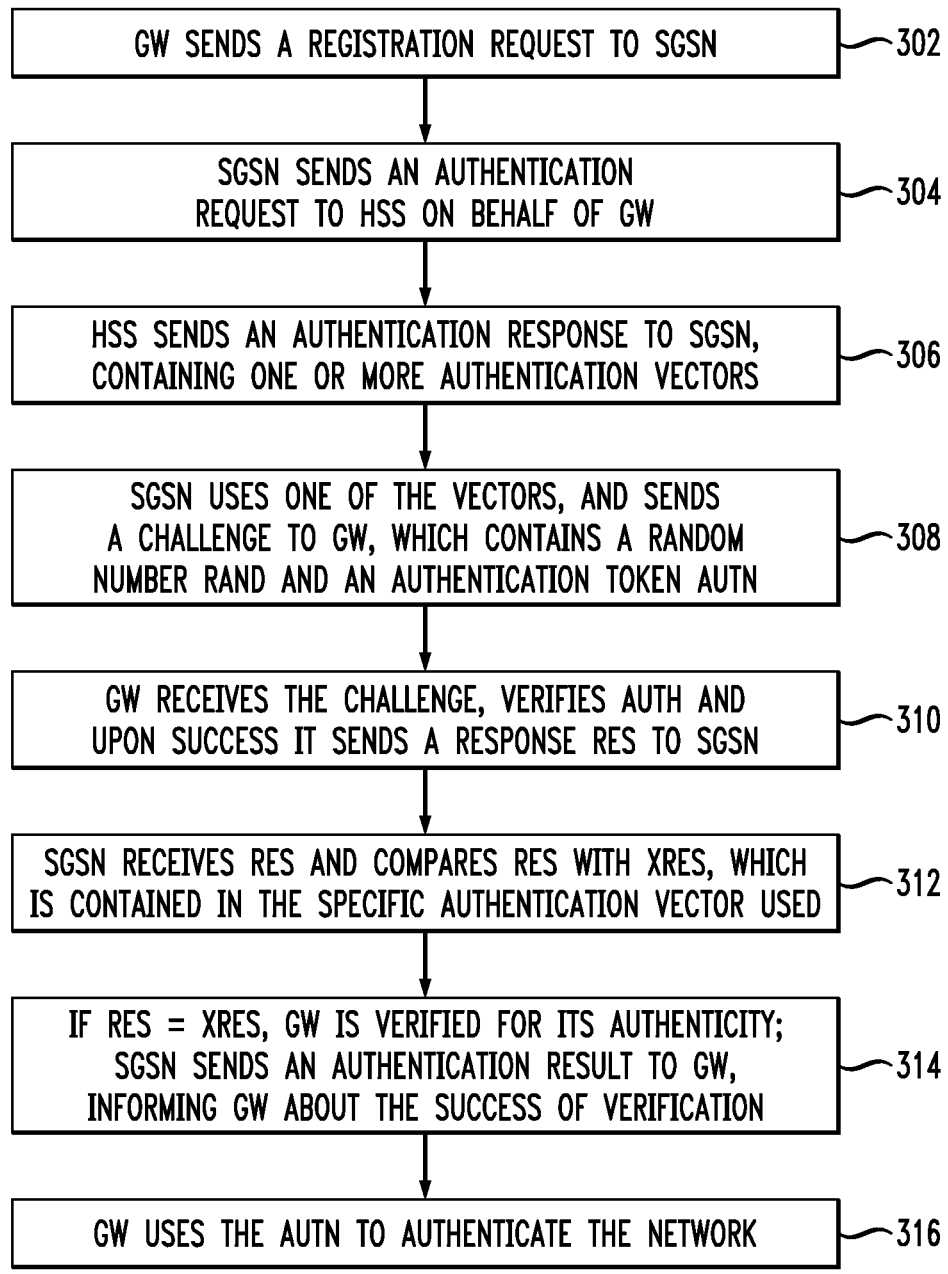

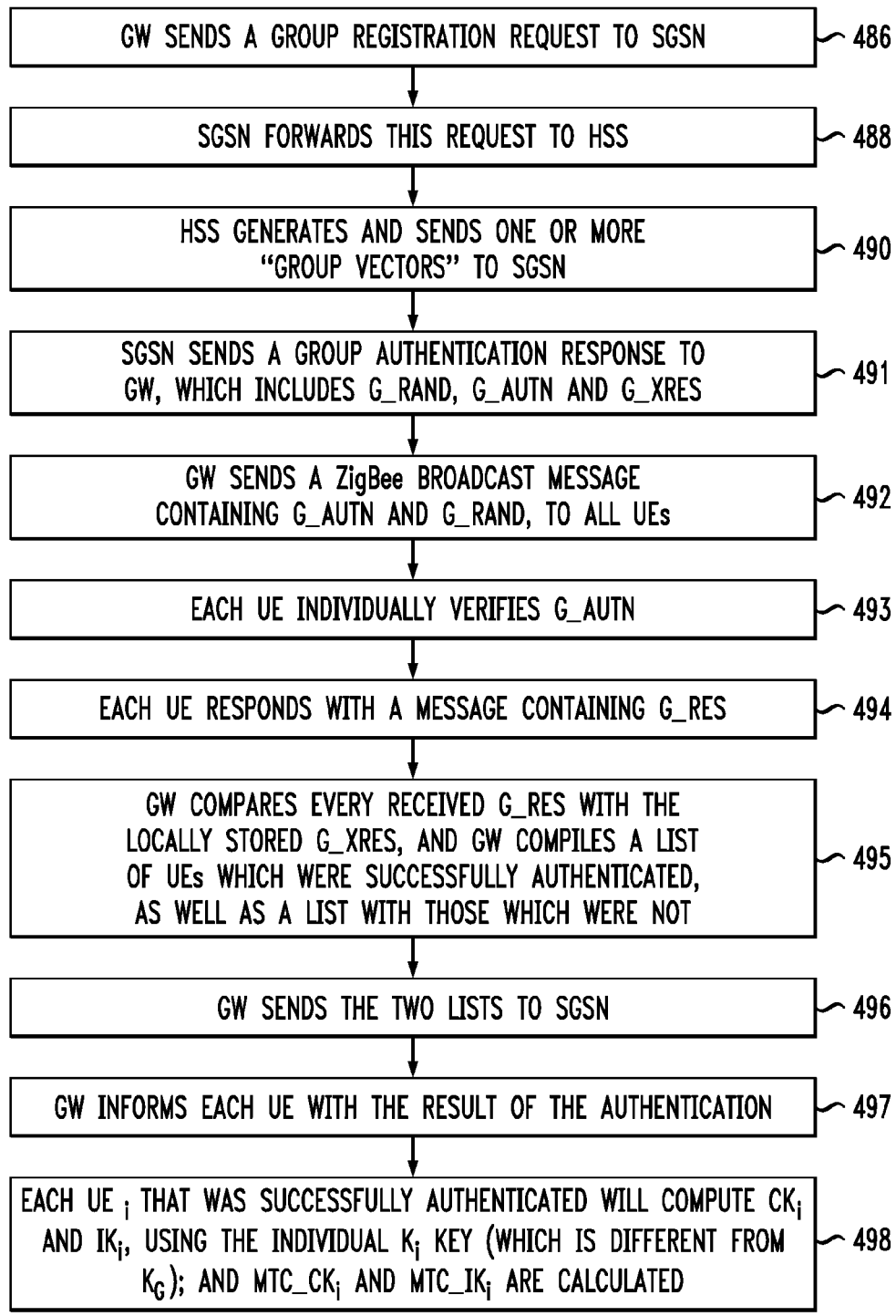

SECURE REGISTRATION OF GROUP OF CLIENTS USING SINGLE REGISTRATION PROCEDURE

FIELD OF THE INVENTION

The present invention relates generally to communication security and, more particularly, to techniques for registering a group of communication devices in a communication network using a single registration procedure.

BACKGROUND OF THE INVENTION

Traditional secure registration protocols rely on clients (or devices) authenticating with a server (or network). For instance, a user (of the client or device) may log on to a server, or a mobile device might register with a network. The registration protocol often includes authentication of client/device to the server/network or a mutual authentication protocol. More recently, with a view towards securing the entire session (not just access), these authentication protocols have been augmented to include a key agreement procedure which allows the client/device and the server/network to agree on a set of keys to secure the entire session.

Examples of one way authentication protocols include: CHAP described in W. Simpson, "PPP Challenge Handshake Authentication Protocol (CHAP)," RFC 1994; PAP described in B. Lloyd, "PPP Authentication Protocols," RFC 1334; GSM triplet based authentication protocols described in European Telecommunications Standards Institute, GSM Technical Specification GSM 03.20 (ETS 300 534): Digital Cellular Telecommunication System (Phase 2); Security Related Network Functions, August 1997, the disclosures of which are incorporated by reference herein in their entireties.

Examples of mutual authentication protocols include: $3^{rd}$ Generation Partnership Project's (3GPP) Authentication and Key Agreement (AKA) protocol described in 3GPP TS 33.102, Technical Specification Group Services and System Aspects; 3G Security; Security Architecture (Release 9), and various Extensible Authentication Protocol (EAP) based mutual authentication protocols such as EAP-TLS (EAP Transport Layer Security) described in B. Aboba and D. Simon, "PPP EAP TLS Authentication Protocol," RFC 2716, the disclosures of which are incorporated by reference herein in their entireties.

These secure registration protocols have been extended to include a client registering with multiple servers, using what is commonly referred to as "single sign-on" protocols. With single sign-on, a user logs in once but gains access to all systems without being prompted to log in again with each system. These protocols are very useful in enterprise environments where a user has authorized access to multiple servers, and would like access to more than one at the same time. An example of a single sign-on protocol is Factotum described in R. Cox, E. Grosse and R. Pike, "Security in Plan 9," USENIX, 2002, the disclosure of which is incorporated by reference herein in its entirety.

However, none of the existing registration approaches provide a mechanism for allowing a "reverse single sign-on," where multiple clients gain access to one system in a secure and efficient manner. It would be desirable to provide techniques for addressing the problem of allowing multiple clients to gain access to one system in a secure and efficient manner and thus a solution to the "reverse single sign-on" problem.

SUMMARY OF THE INVENTION

Embodiments of the invention provide automated secure registration techniques for communication devices which address the problem of allowing multiple clients to gain access to one system in a secure and efficient manner, and thus provide a solution to the "reverse single sign-on" problem as well as other drawbacks of existing registration approaches.

For example, in one aspect, a method for registering a group of two or more communication devices in a communication network comprises the following steps. A group challenge message is sent from a network device to the group of two or more communication devices. The network device receives one or more response messages to the group challenge respectively from one or more of the group of two or more communication devices, wherein the response message from each of the responding communication devices in the group comprises a group credential corresponding to the group.

As part of the registration method, the communication devices of the group may then be authenticated as a group. Then, as part of the registration method, the group of authenticated communication devices may then set up respective data sessions for one or more applications.

It is to be appreciated that the network device can be different entities in the communication network depending on the particular embodiment. For example, in one embodiment, the network device may be an authentication server. In another embodiment, the network device may be a gateway entity. In yet another embodiment, the network device may be a base station.

Advantageously, the inventive registration techniques provide a framework and a procedure to achieve "reverse single sign-on," where multiple clients gain access to one system in a secure and efficient manner. In other words, a group of clients can securely register with the same system using one registration procedure. This allows a significant reduction in signaling related to the client registration process. Furthermore, in an illustrative embodiment, one key feature of the inventive techniques is that, while one registration procedure is used to securely authenticate a group of clients or devices, it is ensured that the session keys that are generated as a result of registration are not the same across clients. This allows each client to securely communicate with the server/network, without compromising on privacy within the group.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2 is a block diagram illustrating a network framework according to an embodiment of the invention.

FIG. 3 is a flow diagram illustrating a mutual authentication procedure between a gateway device and a network according to an embodiment of the invention.

FIG. 4D is a flow diagram of a group authentication protocol according to a fourth embodiment of the invention.

DETAILED DESCRIPTION OF PREFERRED EMBODIMENTS

Figure 1:
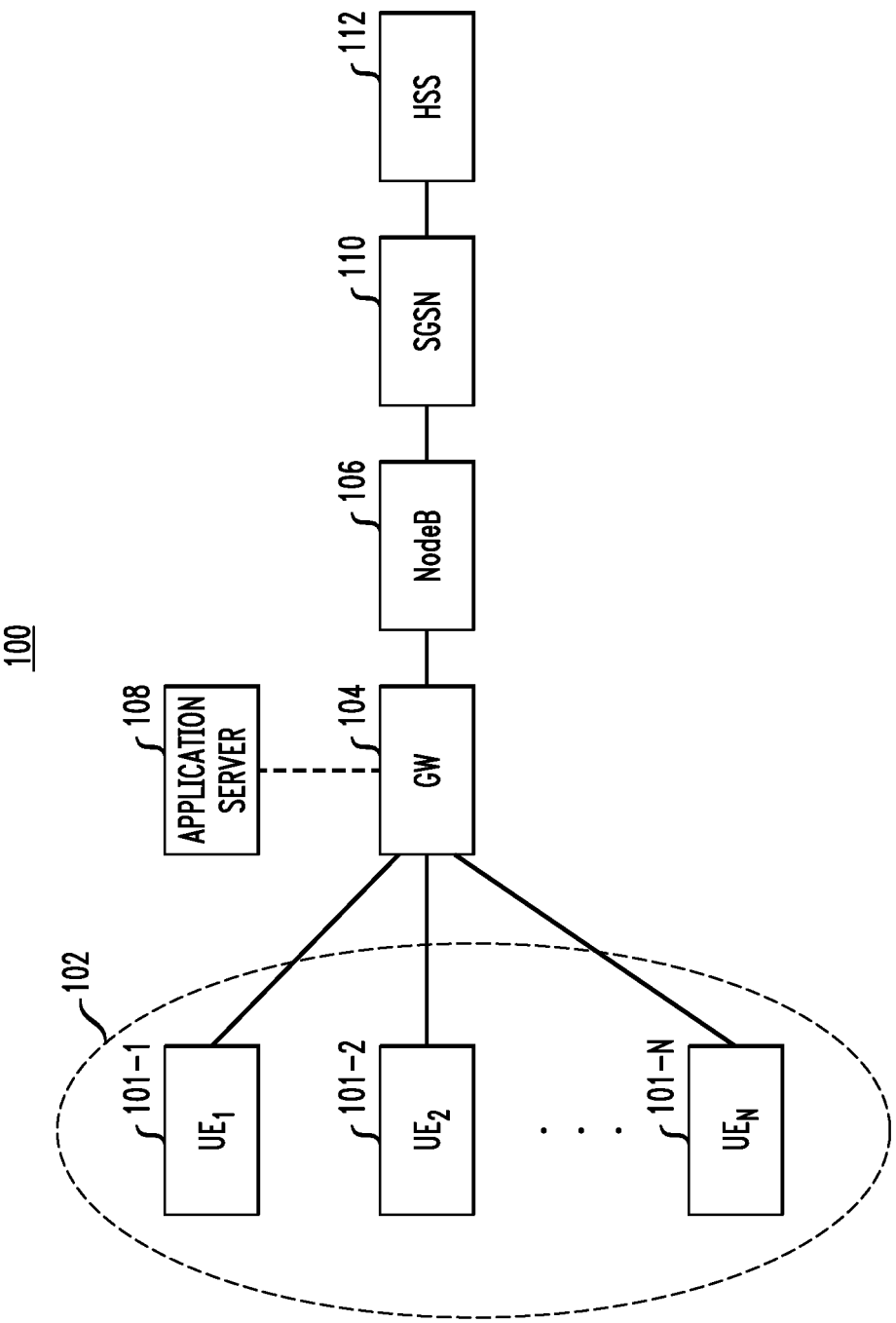
FIG. 1 is a block diagram illustrating a portion of a communication network in which secure registration techniques according to embodiments of the invention may be implemented.

The following description will illustrate the invention in the context of an exemplary machine-to-machine (M2M), also known as machine-type-communications (MTC), environment. It should be understood, however, that while principles of the invention are particularly suitable to such an M2M or MTC environment, the invention is not limited to use with such an environment. That is, principles of the invention are generally applicable to any communication environment in which it would be desirable to provide secure registration features for a group of devices (users) using a single registration procedure.

One type of communication device that is particularly suitable for use with principles of the invention is referred to as an "open device." The phrase "open device" may be generally defined as a communication device operating in a network on which one can run applications (e.g., firmware or software) from any provider other than the network operator without prior approval by the network operator. Examples of these types of devices include but are not limited to sensors, location tags, machines, monitors, and meters. The types of applications that such devices can enable are conceivably limitless. By way of only a few examples, such application-specific devices may include health monitors, utility management meters, fleet management tags, vending machines, and point-of-sale terminals.

Thus, an environment with open devices, such as M2M devices, securely operating over a publicly-accessible wide area communication network, such as a cellular network operated by a cellular network operator (by way of example only, Verizon, AT&T or Sprint), is an environment where illustrative embodiments of the invention may be implemented.

In accordance with illustrative embodiments of the invention, a framework and a protocol are provided to achieve what can be thought of as "reverse single sign-on," where multiple clients gain access to one system. As mentioned above, a group of clients can securely register with the same system using one registration procedure. This allows a significant reduction in signaling related to the client registration process, as will be described below in detail. One key feature of the inventive framework and protocol is that, while one registration procedure is used to securely authenticate a group of clients or devices, it is ensured that the session keys that are generated as a result of registration are not the same across clients. This allows each client to securely communicate with the server/network, without compromising on privacy within the group. Note that while existing approaches may have attempted to address the problem of group authentication, they have focused on mechanisms to validate that a device (or user) is a member of a group, rather than authenticating all devices as a group with the same authentication entity (authenticator), as will be described below in detail.

It is to be appreciated that while the illustrative detailed description of the invention below describes a security framework for performing group authentication and key agreement with applications to M2M or MTC, the framework may be implemented to address other applications as well, where group registration makes sense. As an example, with the inventive framework applied to MTC, a NO (Network Operator) and/or the M2MO (M2M Operator) will be capable of authenticating a set of devices that are grouped together as per a grouping policy. Hence, there is no need to establish individual sessions with each M2M device towards authenticating each of them individually. In contrast, the inventive framework authenticates devices belonging to a particular group at once, thereby reducing the complexity and the bandwidth requirements of the authentication procedure to a large extent.

For ease of reference, the remainder of the detailed description is divided as follows. Section I describes an overview of a group registration framework according to an illustrative embodiment of the invention. Section II describes design assumptions associated with the illustrative embodiment of the invention. Section III describes details of secure group registration protocols according to illustrative embodiments of the invention. Section IV describes an illustrative computing system for implementing one or more secure group registration protocols according to an illustrative embodiment of the invention.

I. Overview of a Group Registration Framework

Let us consider a deployment of N (communication) devices and that an authentication entity (authenticator) needs to authenticate each of these devices before authorizing them to access one or more services. With existing protocols, the authenticator needs to establish an individual session and exchange a fixed number of authentication messages with each device. Hence, if the deployment includes N devices, and if k number of messages need to be exchanged between the authenticator and every device, then a total of N*k messages need to be transmitted over the air in order for all of these devices to be authenticated.

As an example, let us assume that N=100,000, and that the authenticator uses the AKA mutual authentication protocol (as described in 3GPP TS 33.102, Technical Specification Group Services and System Aspects; 3G Security; Security Architecture (Release 9); and 3GPP TS 33.401, Technical Specification Group Services and System Aspects; 3GPP System Architecture Evolution (SAE); Security Architecture (Release 9), the disclosures of which are incorporated by reference herein in their entireties). As per the AKA protocol, the authenticator sends a user authentication request to the client, which includes a random challenge (RAND) and an authentication token (AUTN); hence k=2 in this case. As a result, 200,000 individual messages are totally required with the existing approach. At the end of this overall process, each of the N devices will generate a session key, i.e., a total of 100,000 session keys will be mutually generated between the authenticator and each device with the existing approach.

Note that instead of one authenticator, multiple authenticators may exist, each for authorizing a different type of service. In such a case, with the existing approach, every device will have to separately hold a distinct authentication process with each of the authenticators. Fortunately for such scenarios, the notion of "single sign-on" can be used, wherein a device can use a single set of credentials to authenticate with the various different authenticators (as described in R. Cox, E. Grosse and R. Pike, "Security in Plan 9," USENIX, 2002, the disclosure of which is incorporated by reference herein in its entirety). However, single sign-on is not preferable in the case where many clients need to be authenticated by a single authenticator; every device needs to generate different security credentials during registration, since individual device data secrecy needs to be preserved.

Given the above discussion, the illustrative registration techniques of the invention address the question of how a group of N devices can be authenticated using a single registration procedure. Specifically, a goal of a solution that addresses this question is to design a "reverse single sign-on" mechanism, with which we will be able to authenticate N devices (thereby generating N mutual session keys) as a "group," while accommodating the following:

(1) Ensure the same strength of security as in the case of individual device authentication;

(2) Establish individual, unique keys per device, such that device data is secured against potential attacks originated from other devices (even those belonging in the same group); and (3) Use a reduced number of authentication messages— preferably, exchange as many messages with the authenticator, using the same bandwidth, as in the case of a single authentication process.

The inventive framework and protocols described herein achieve the aforementioned targets. In one embodiment of our solution, main aspects of our architectural design are the following:

(1) We introduce a new network entity called GW (GateWay). GW is an aggregator, which collects authentication responses from all devices (also referred to herein as "user equipment" or UE) belonging in a group. Typically, GW is located in relatively close proximity to the devices of the group.

(2) For the purpose of group authentication, all devices of a group exchange authentication messages only with GW. The GW is further responsible to perform negotiations with the authenticator for validating the credentials of each device in the group. In one embodiment, the framework also allows GW to be the authenticator. For this, GW needs to receive the necessary information that will be used for authenticating every device in the group. Note that this latter embodiment is preferred for saving bandwidth and substantially reducing the overall required signaling.

(3) For authenticating the group of devices, group credentials (in particular a group key) are provisioned prior to registration; these are the same for all devices in the group. The design of the framework includes different alternative group authentication procedures; each of them can be applied and parameterized based on the network operator preferences. Depending on the actual procedure that is selected, the group credentials may be provisioned either to each device, or to the GW. The group authentication process is based on a group challenge: GW broadcasts a group challenge message to all devices in the group. Devices individually respond to this challenge with a message to the GW. Note that while the group credentials are used for group authentication, both these and the individual credentials are used by each device for generating unique encryption and integrity protection key material, as will be described below.

(4) The communication between the GW and each device in the group preferably uses unlicensed bandwidth (e.g., bandwidth allocated for ZigBee, WiFi, etc.). With this approach, much less signaling is required between the access network and the GW using the licensed bandwidth that is allocated to the network operator.

In a different embodiment of the inventive solution, group authentication operations are applied in the absence of a GW. In such cases, it is the responsibility of the base station to broadcast the group challenge and receive the individual responses from each device. Here, group authentication is still beneficial, since the base station simply needs to broadcast one message rather than send an individual, unique challenge to each device. However, since challenge responses are transmitted by the devices on the access network operator's bandwidth, the benefits due to group authentication are not as large as with the use of a GW.

Advantageously, it is evident that the group authentication framework of the invention can offer unprecedented network performance benefits. This is expected to especially be the case in scenarios where a large number of devices need to register with one or more network entities.

II. Design Assumptions

The illustrative framework of the invention to be described herein is designed based on the following assumptions:

(1) Devices are grouped together based on a particular policy, and they are aware of the group(s) that they belong to. The policy making procedures and the functionality of network entities that are involved on developing such a policy are beyond the scope of our framework design. In other words, our framework is agnostic to the policy based on which a group of client devices is formed.

(2) A group of N devices is represented by a group identifier or identity (ID), which is known to all the network entities that are involved in the group authentication process; they are the same entities that are used for authenticating individual devices. Those entities are also aware of the identities of all the devices that belong to such a group. Such information can be stored locally in every entity in the form of a lookup table. We assume that entities are synchronized in terms of the contents of their locally stored lookup tables.

(3) Each communication device (also referred to as "user equipment" or UE in the detailed description below) that belongs in a group, maintains a wireless connection with a local gateway (GW), using unlicensed spectrum (e.g., ZigBee). To begin with, we assume that a UE is not equipped with a 3GPP capable interface for the purposes of registration. Hence, any control or data traffic between the UE and the network for group authentication and key agreement purposes goes through the GW. If UE is equipped with 3GPP (or 3GPP2 or WIMAX) capable interface, then the base station performs the role of GW.

(4) In some cases, UEs have been pre-provisioned with certain credentials (called group keys—explained below), which they use for generating authentication and key material during group authentication. In other cases, only the GW is aware of the group key, while the UEs are not.

(5) The 3GPP network where the GW is connected is a UMTS (Universal Mobile Telecommunications System) network.

(6) One advantage of UE group authentication is for further establishing data sessions with a remote application server. We assume that this server has already been mutually authenticated with the 3GPP network.

(7) We assume that the link between UE and GW is protected at the link layer. Hence, any communication between UE and GW is potentially encrypted using link layer credentials.

FIG. 1 illustrates one system for providing such inventive framework and protocols. As shown in a part of a communication network 100, a plurality of communication devices or user equipment (UE) 101-1, 101-2 . . . 101-N, comprising a group 102, are operatively coupled to a network device referred to as a gateway device (GW) 104. The group may contain more or less UEs. GW 104 is operatively coupled to a base station referred to as NodeB 106 and an application server 108. As is known, Node B is a base station in accordance with UMTS terminology and is equivalent to the BTS (base transceiver station) used in GSM (Global System for Mobile Communications) terminology. Thus, the network element 106 may be a NodeB or a BTS or any form of base station depending on the communication network being accessed. In an application where the UEs are mobile phones, the NodeB is the network device that is connected to the mobile phone network and that typically communicates directly with the mobile handsets. However, in the embodiment of FIG. 1, the GW 104 communicates directly with the UEs. Node B typically uses WCDMA/TD-SCDMA (Wideband Code Division Multiple Access/Time Division Synchronous Code Division Multiple Access) as the air interface technology.

The NodeB 106 is operatively coupled to a Serving GPRS Support Node (SGSN) 110. The SGSN is a main component of the General Packet Radio Service (GPRS) network, which typically handles all packet switched data within the network, e.g., the mobility management and authentication of the users. However, as will be explained below, authentication is performed in accordance with GW 104.

The SGSN 110 is operatively coupled to a Home Subscriber Server (HSS) 112, also known as a Home Location Register (HLR). The HSS 112 is a database in which information from mobile subscribers (users) is stored. The HSS typically contains information about the subscribers' identity, telephone number, associated services and general information about the location of the subscriber. The exact location of the subscriber is typically kept in a Visitor Location Register (VLR, not shown).

III. Group Authentication Framework and Applications

According to one embodiment of the invention, the group authentication framework is comprised of five main network framework modules. It is to be understood that the term "module" as used herein is intended to refer to a main function that is performed in accordance with one or more of the network components shown in FIG. 1 (i.e., UE 101, GW 104, NodeB 106, application server 108, SGSN 110, and HSS 112). FIG. 2 shows the modules of a network framework 200. Each of the network framework modules are further respectively described in the following subsections A through E below.

As shown, a framework module 202 (described in subsection A below) is provided for GW registration with the 3GPP network and the connection establishment with the M2M application server.

A framework module 204 (described in subsection B below) is provided for notifying a group for UEs with regards to an upcoming authentication.

A framework module 206 (described in subsection C below) is provided that performs the group authentication protocol operation.

A framework module 208 (described in subsection D below) is provided that provides IP (Internet Protocol) addresses to UEs belonging in the group.

A framework module 210 (described in subsection E below) is provided for registering the group of devices with the M2M application server (108 of FIG. 1), after the group authentication by the 3GPP network has been successfully completed.

It is to be understood then that, in an illustrative embodiment, some portion of the functionality of each framework module in FIG. 2 is performed in two or more of the network components of FIG. 1. This will be clear from the description in each of subsections A through E. It is also to be understood, however, that the invention is not intended to be limited to the distribution of module functionality illustratively described below. Rather, one function illustrated as being performed in one component could alternatively be performed in another component, e.g., a function of a framework module shown as being performed in the SGSN 110 could alternatively be performed in the GW 104, and so on.

We now present the modular design of an illustrative group authentication framework in detail. For the sake of description tractability, we assume a deployment of a number (N) of M2M devices (as described in 3GPP TS 22.368, Technical Specification Group Services and System Aspects; Service Requirements for Machine Type Communications (MTC); Stage 1 (Release 10), the disclosure of which is incorporated by reference herein in its entirety). In alignment with the discussion above, a NO (Network Operator) and/or the M2MO (M2M Operator) will be capable of authenticating the set of N M2M devices that are grouped together as per a grouping policy. Hence, there is no need to establish individual sessions with each M2M device towards authenticating each of them individually. In contrast, the inventive framework authenticates M2M devices belonging to a particular group at once, thereby reducing the complexity and the bandwidth requirements of the authentication procedure to a large extent. We discuss each of the five main modules of the inventive framework in the following subsections A through E, respectively.

A. Mutual Authentication Between GW and the 3GPP Network (Framework Module 202 in FIG. 2)

Before authenticating UEs 101-1, 101-2 . . . 101-N, GW 104 needs to be authenticated first. In addition, GW needs to verify that the network is also authentic. By "the network" here, it is meant the UMTS network (3GPP) to which the gateway serves as an access point for the UEs (e.g., network including NodeB 106, application server 108, SGSN 110, HSS 112, etc.). For this authentication, in one embodiment, an Authentication and Key Agreement (AKA) procedure is employed. For example, the AKA procedure described in 3GPP TS 33.102, the disclosure of which is incorporated by reference herein in its entirety, may be employed, treating GW 104 as a 3GPP client UE, as far as the UMTS network is considered.

FIG. 3 illustrates the steps of this GW and 3GPP network mutual authentication procedure. As shown, mutual authentication procedure 300 includes the following steps:

1. GW 104 sends a registration request to SGSN 110 (step 302).
2. SGSN 110 sends an authentication request to HSS 112 on behalf of GW 104 (step 304).

3. HSS 112 sends an authentication response to SGSN 110, containing one or more authentication vectors (step 306).
4. SGSN 110 uses one of the vectors, and sends a challenge to GW 104, which contains a random number RAND and an authentication token AUTN (step 308).
5. GW 104 receives the challenge, verifies AUTH and upon success it sends a response RES to SGSN 110 (step 310).
6. SGSN 110 receives RES and compares RES with XRES, which is contained in the specific authentication vector used (step 312).
7. If RES=XRES, GW 104 is verified for its authenticity; SGSN 110 sends an authentication result to GW 104, informing GW 104 about the success of verification (step 314).
8. GW 104 uses the AUTN to authenticate the network (step 316), as per 3GPP TS 33.102.

Assuming that SGSN 110 verifies that XRES=RES and that GW 104 also verifies the authenticity of AUTN, at the end of this process a mutual authentication is considered successful, as per 3GPP TS 33.102; an encryption key ($CK_i$) and integrity key ($IK_i$) are generated and used for encrypting and integrity protecting subsequent packet exchanges, using a cryptographic algorithm that is supported by both GW 104 and the RAND. In addition, given that GW 104 is successfully authenticated, a PDP (Packet Data Protocol) context is established between GW 104 and GGSN/SGSN 110, with which GW 104 is allowed to establish a (potentially secure) session with the remote M2M application server 108. One way in which such a session is established is described below.

B. Notifying the Group of UEs with Regards to an Upcoming Authentication (Framework Module 204 in FIG. 2)

In order for a group 102 of M2M devices 101-1, 101-2 . . . 101-N (as in FIG. 1) to be authenticated, all devices of the group need to be simultaneously active (alive), i.e., maintain active connections with GW 104. However, depending on the application and the software configuration of each device, it is possible that some devices in the group are in the sleep mode. For example, some M2M applications (such as smart metering applications) require that M2M devices wakeup at predetermined time intervals, establish a connection to the M2M application server 108 and upload their data. For authenticating groups of such devices, all devices of a group should be alive. The inventive framework provides four illustrative ways of "preparing" the devices of a group for authentication. We discuss them in the following subsections. It is to be understood that the messages passing between the GW 104 and UEs 101-1, 101-2 . . . 101-N, as will be described below, are passed over the links shown connecting the UEs and the GW in FIG. 1.

B1. M2M Application Server Originated "Wakeup" Signaling

With this approach, the M2M application server 108 or HSS 112 communicates a special "wakeup" (activation) message to GW 104. This wakeup message contains the ID of the group that is to be authenticated. As soon as GW 104 receives this message, it uses its locally stored lookup table to derive the set of UEs that belong to the specific group. Subsequently, GW 104 transmits a broadcast message (e.g., a ZigBee message) to all of the devices of the group with the specific ID.

It is to be appreciated that while principles of the invention are not limited to use with any particular communication standard, in certain of the illustrative embodiments described herein, a communication standard used is the ZigBee standard. As is known, ZigBee is a specification for a suite of high level communication protocols using small, low-power communication devices based on the IEEE 802.15.4-2003 standard. The technology is defined by the ZigBee specification (2006 version), the disclosure of which is incorporated by reference herein in its entirety. The ZigBee Alliance is a group of companies that maintain and publish the ZigBee standard (see http://www.zigbee.org).

As soon as a UE receives this message, it determines whether it is a part of the specific group. If it is, then it further establishes (or restores) a connection (e.g., ZigBee connection) with GW 104. At the end of this process, all devices of the group are ready to participate in the authentication process, and a common encryption key (e.g., ZigBee key $K_{ZB}$) is established.

B2. Scheduled Registration at Predetermined Time Intervals

Instead of using a wakeup message to notify the group of devices (101-1, 101-2 . . . 101-N), the devices can be scheduled to wakeup (self-activate) at certain time intervals in order to participate in the authentication process. Such a procedure requires loose time synchronization between the devices and GW 104. The scheduled time of wakeup can be either pre-provisioned at manufacture time, or provisioned over the air. As soon as a UE wakes up, it will establish a ZigBee connection with GW, as described in subsection B1 above. Note that with such a procedure, the group can be authenticated at times where there is little or no traffic between UEs and the M2M application server 108. Hence, as long as a group of UEs are authenticated and assigned their IP addresses, they can go back to sleep mode; when they wake up, they can use their assigned IP addresses to establish data connections to the M2M application server 108.

B3. Caching of Authentication Material at GW

The above two approaches provide that all UEs wakeup at the same time and simultaneously establish ZigBee connections with GW. Such a procedure, however, imposes extra control signaling overheads on the links between each UE 101 and GW 104, especially when groups are comprised of a large number of UEs (such as in cases of sensor network deployments). In scenarios where the M2M server requires that a large number of M2M devices (belonging to the same group) send their data to the server (GW 104), it is expected that such devices will be being scheduled to wake up not all at once, but with some delay in their schedules. With this, GW 104 will not be overloaded. On the other hand, recall that for authenticating a group, all devices belonging to the group need to be alive. For this, our framework provides the option of caching authentication material at the GW 104. In particular, as soon as the first UE 101 from the group 102 wakes up and establishes a ZigBee connection with GW 104 (for the purposes of group authentication), the latter will request authentication material from the core network (this procedure is described in subsection C below). In addition, GW 104 will cache this material until all UEs of the group are alive so that the group authentication process can be initiated. The cached parameters (G_AUTN and G_RAND) as well the way they are used by GW 104 is described in subsection C below.

B4. Caching of Authentication Material and Group Authentication Locally at GW

Our framework also provides a mechanism for GW 104 to authenticate the intended group of devices, as long as GW is capable of performing such a task. In other words, GW 104 now becomes responsible for: (i) verifying that the group of devices is authentic; and (ii) reporting the result of the authentication to the 3GPP core network entities (NodeB 106, SGSN 110, HSS 112, etc.) and to the M2M application server 108. Similarly as described above in subsection B3, GW 104 receives and caches a set of authentication parameters. However, now GW 104 needs to cache an additional parameter (called G_XRES) in order to run the authentication process locally. We explain how such a process is performed in the following subsection.

C. Group Authentication Protocol (Framework Module 206 in FIG. 2)

The group authentication protocol is initiated as soon as GW 104 has confirmed that all the UEs in the group of interest are alive and have established active ZigBee sessions. In what follows, we present five illustrative embodiments of this protocol.

C1. SGSN Verifies the Authenticity of the Devices in the Group

Figure 4A:
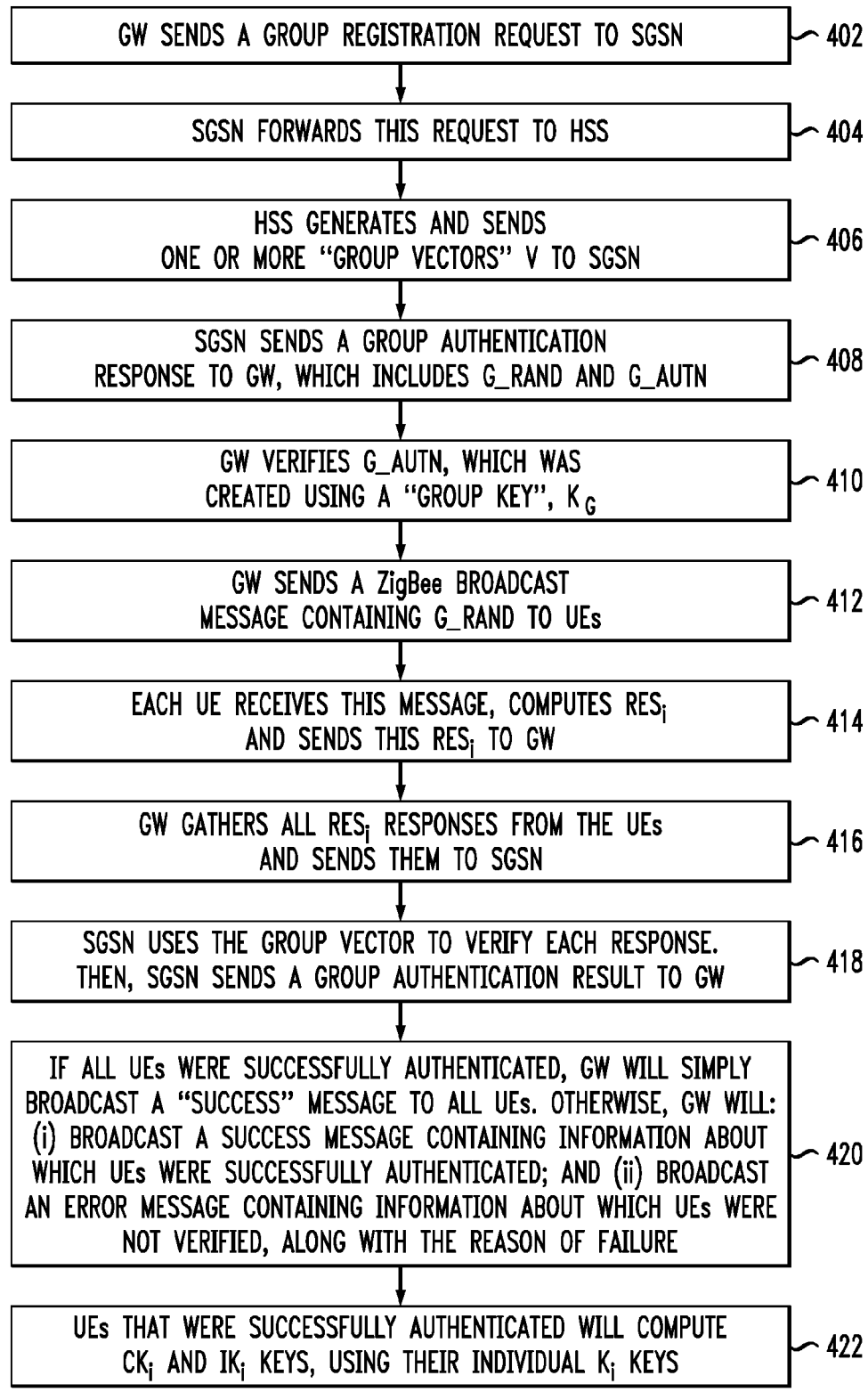
FIG. 4A is a flow diagram of a group authentication protocol according to a first embodiment of the invention.

This approach is shown in FIG. 4A. With protocol 400, GW 104 gathers authentication responses from all devices of the group, and forwards these responses to SGSN 110 for verification. In particular, the steps of the protocol are as follows:

1. GW 104 sends a group registration request to SGSN 110 (step 402).
2. SGSN 110 forwards this request to HSS 112 (step 404).
3. HSS 112 generates and sends one or more "group vectors" V to SGSN 110 (step 406). Such a vector is of the following form:
   V={G_AUTN, G_RAND, [XRES$_1$, CK$_1$, IK$_1$], [XRES$_2$, CK$_2$, IK$_2$], . . . , [XRES$_N$, CK$_N$, IK$_N$]}
   These parameters are defined in the same way as in 3GPP TS 33.102.
4. SGSN 110 sends a group authentication response to GW 104 (step 408), which includes G_RAND and G_AUTN. Note that GW 104 may cache G_RAND and G_AUTN, as described above in sections B3 and B4.
5. GW 104 verifies G_AUTN, which was created using a "group key," K$_G$ (step 410). This key is not known to the UEs, and has been already provisioned to GW.
6. GW 104 sends a ZigBee broadcast message containing G_RAND to UEs (step 412). This message is encrypted with K$_{ZB}$, as per the above-cited ZigBee standard.
7. Each UE 101 receives this message, computes RES$_i$ and sends this RES$_i$ to GW 104 (step 414).
8. GW 104 gathers all RES$_i$ responses from the UEs 101 and sends them to SGSN 110 (step 416). Here, GW 104 may either forward the individual responses from the UEs 101, or alternatively aggregate the responses in fewer, larger messages to SGSN 110.
9. SGSN 110 uses the group vector to verify each response, and then, SGSN 110 sends a group authentication result to GW 104 (step 418). This message contains the authentication result for each UE.
10. If all UEs 101 were successfully authenticated, GW 104 will simply broadcast a "success" message to all UEs. Otherwise, GW 104 will: (i) broadcast a success message containing information about which UEs were successfully authenticated; and (ii) broadcast an error message containing information about which UEs were not verified, along with the reason of failure (step 420). Alternatively, the "success" message may be omitted; UEs 101 that were successfully authenticated could become aware of the successful authentication by examining whether their ID is included in the error broadcast message. Each UE 101 individually acknowledges the reception of the broadcast message to GW 104, which forwards a common acknowledgment message to SGSN 110.
11. UEs 101 that were successfully authenticated will compute CK$_i$ and IK$_i$ keys, using their individual K$_i$ keys (step 422) (see 3GPP TS 33.102).

C2. HSS Verifies the Authenticity of the Devices in the Group

Figure 4B:
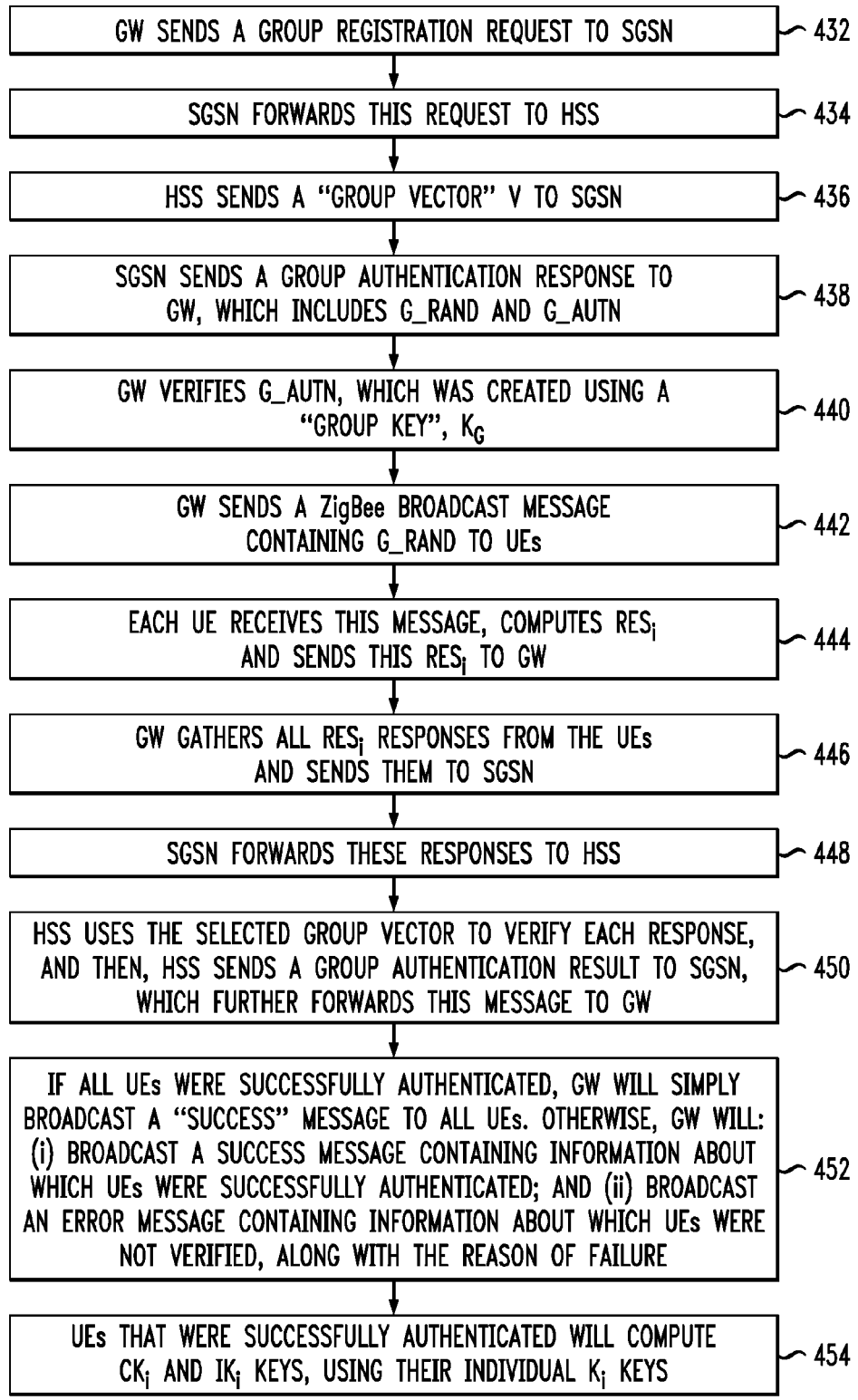
FIG. 4B is a flow diagram of a group authentication protocol according to a second embodiment of the invention.

This approach is shown in FIG. 4B. Instead of HSS 112 providing authentication vector(s) to SGSN 110 for verifying the responses of the UEs 101 as per step 9 above in subsection C1, HSS 112 may alternatively perform the verification of the RES$_i$ responses. In this case, SGSN 110 need not be aware of the [XRES$_1$, CK$_1$, IK$_1$]. Clearly in this case, GW 104 will send the RES$_i$ responses from the UEs 101 to HSS 112, through SGSN 110. More specifically, the steps of the protocol 430 in this case are as follows:

1. GW 104 sends a group registration request to SGSN 110 (step 432).
2. SGSN 110 forwards this request to HSS 112 (step 434).
3. HSS 112 sends a "group vector" V to SGSN 110 (step 436). This vector is of the following form: V={G_AUTN, G_RAND}. These parameters are defined in the same way as in 3GPP TS 33.102.
4. SGSN 110 sends a group authentication response to GW 104, which includes G_RAND and G_AUTN (step 438). Note that GW 104 may cache G_RAND and G_AUTN, as described above in sections B3 and B4.
5. GW 104 verifies G_AUTN, which was created using a "group key," K$_G$ (step 440). This key is not known to the UEs; it has been already provisioned to GW.
6. GW 104 sends a ZigBee broadcast message containing G_RAND to UEs 101 (step 442). This message is encrypted with K$_{ZB}$, as per the ZigBee standard.
7. Each UE 101 receives this message, computes RES$_i$ and sends this RES$_i$ to GW 104 (step 444).
8. GW 104 gathers all RES$_i$ responses from the UEs 101 and sends them to SGSN 110 (step 446). Here, GW 104 may either forward the individual responses from the UEs 101, or alternatively aggregate the responses in fewer, larger messages to SGSN 110.
9. SGSN 110 forwards these responses to HSS 112 (step 448).
10. HSS 112 uses the selected group vector to verify each response, and then, HSS 112 sends a group authentication result to SGSN 110, which further forwards this message to GW 104 (step 450). This message contains the authentication result for each UE 101.
11. If all UEs 101 were successfully authenticated, GW 104 will simply broadcast a "success" message to all UEs 101. Otherwise, GW 104 will: (i) broadcast a success message containing information about which UEs were successfully authenticated; and (ii) broadcast an error message containing information about which UEs were not verified, along with the reason of failure (step 452). Alternatively, the "success" message may be omitted; UEs 101 that were successfully authenticated could become aware of the successful authentication by examining whether their ID is included in the error broadcast message. Each UE 101 individually acknowledges the reception of the broadcast message to GW 104, which forwards a common acknowledgment message to HSS 112.
12. UEs 101 that were successfully authenticated will compute CK$_i$ and IK$_i$ keys, using their individual K$_i$ keys (step 454) (see 3GPP TS 33.102).

Figure 4C:
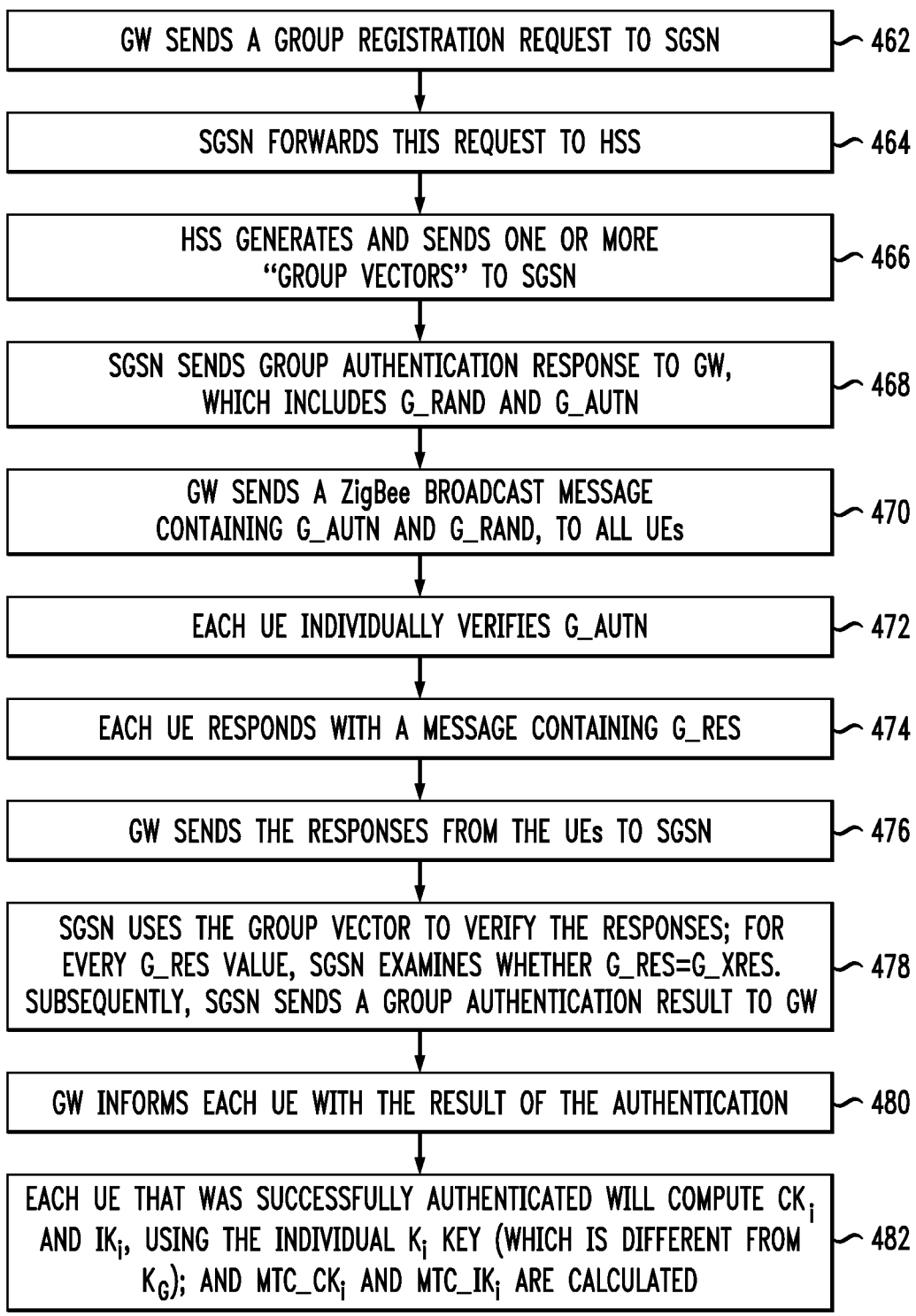
FIG. 4C is a flow diagram of a group authentication protocol according to a third embodiment of the invention.

C3. UEs are Aware of the Group Key, while GW is not; SGSN Verifies the Authenticity of the Devices in the Group Procedures C1 and C2 are overhead intensive, since GW 104 needs to send the individual $RES_i$ values to SGSN 110 (with C1) or even to HSS 112 (with C2). In scenarios where the group consists of a large number of devices (such as in the case of sensors, where potentially thousands of devices could be communicating with GW), the link between GW and the 3GPP network will be over-utilized. An alternative protocol 460 is described in FIG. 4C. Here it is assumed that all UEs are aware of the common $K_G$ key.

1. GW 104 sends a group registration request to SGSN 110 (step 462).
2. SGSN 110 forwards this request to HSS 112 (step 464).
3. HSS 112 generates and sends one or more "group vectors" to SGSN 110 (step 466). Such a vector is of the following form:
   V={G_AUTN, G_RAND, G_XRES, [MTC_CK$_1$, MTC_IK$_1$], . . . , [MTC_CK$_N$, MTC_IK$_N$]}
4. SGSN 110 sends a group authentication response to GW 104, which includes G_RAND and G_AUTN (step 468). Note that GW 104 may cache G_RAND and G_AUTN, as described above in sections B3 and B4.
5. GW 104 sends a ZigBee broadcast message containing G_AUTN and G_RAND, to all UEs 101 (step 470). Note that GW can not verify G_AUTN, since it is not provisioned with $K_G$ in this case.
6. Each UE 101 individually verifies G_AUTN (step 472).
7. Each UE 101 responds with a message containing G_RES (step 474). The value of G_RES is computed using the provisioned $K_G$ key. Recall that this key is only known to UEs 101 and to HSS 112; it is not known to GW 104. Note also that since each UE 101 receives the same G_RAND and has $K_G$, each legitimate UE 101 should compute the same value for G_RES.
8. GW 104 sends the responses from the UEs 101 to SGSN 110 (step 476). Clearly, this message is expected to occupy much less bandwidth than in the cases of C1 and C2, since GW 104 can group together the UE identities that provided the same G_RES value.
9. SGSN 110 uses the group vector to verify the responses; for every G_RES value, SGSN 110 examines whether G_RES=G_XRES. Subsequently, SGSN 110 sends a group authentication result to GW 104 (step 478).
10. GW 104 informs each UE 101 with the result of the authentication (step 480). If all UEs 101 were successfully authenticated, GW 104 will simply broadcast a "success" message to all UEs 101. Otherwise, GW 104 will: (i) broadcast a success message containing information about which UEs 101 were successfully authenticated; and (ii) broadcast an error message containing information about which UEs 101 were not verified, along with the reason of failure. Alternatively, the "success" message may be omitted; UEs 101 that were successfully authenticated could become aware of the successful authentication by examining whether their ID is included in the error broadcast message. Each UE 101 individually acknowledges the reception of the broadcast message to GW 104, which forwards a common acknowledgment message to SGSN 110.
11. Each UE 101 that was successfully authenticated will compute $CK_i$ and $IK_i$, using the individual $K_i$ key (which is different from $K_G$), and, in addition, MTC_$CK_i$ and MTC_$IK_i$ are calculated (step 482) as follows:

MTC_$CK_i$=$CK_i$ XOR $CK_G$

MTC_$IK_i$=$IK_i$ XOR $IK_G$ where:
$CK_G$=$f_3$($K_G$, G_RAND), $IK_G$=$f_4$($K_G$, G_RAND)
$CK_i$=$f_3$($K_i$, G_RAND), $IK_i$=$f_4$($K_i$, G_RAND)

Similarly as in subsection C2, HSS 112 may decide to verify the UEs' responses, rather than assigning this task to SGSN 110. In this case, only G_AUTN and G_RAND are sent to SGSN 110, as per subsection C2.

C4. GW Verifies the Authenticity of the Devices in the Group and Reports the Results In order to further reduce the bandwidth requirements of the group authentication protocol, the 3GPP network may assign the verification of the group's authenticity to GW 104. In order for GW 104 to be able to perform such a task, it needs to be able to examine whether a response from a UE 101 contains a correctly calculated G_RES value. Therefore, GW 104 needs to receive an authentication vector that already includes the G_XRES parameter. As in case C3 above, here it is assumed that all UEs 101 are aware of the common $K_G$ key. More specifically, the steps of the protocol 485 in this case are shown in FIG. 4D and are as follows:

1. GW 104 sends a group registration request to SGSN 110 (step 486).
2. SGSN 110 forwards this request to HSS 112 (step 488).
3. HSS 112 generates and sends one or more "group vectors" to SGSN 110 (step 490). Such a vector is of the following form:
   V={G_AUTN, G_RAND, G_XRES, [MTC_CK$_i$, MTC_IK$_1$], [MTC_CK$_N$, MTC_IK$_N$]}
4. SGSN 110 sends a group authentication response to GW, which includes G_RAND, G_AUTN and G_XRES (step 491). Note that GW 104 may cache these parameters, as described above in sections B3 and B4.
5. GW 104 sends a ZigBee broadcast message containing G_AUTN and G_RAND, to all UEs 101 (step 492). Note that GW 104 can not verify G_AUTN, since it is not provisioned with $K_G$ in this case.
6. Each UE 101 individually verifies G_AUTN (step 493).
7. Each UE 101 responds with a message containing G_RES (step 494). The value of G_RES is computed using the provisioned $K_G$ key. Recall that this key is only known to UEs 101 and to HSS 112; it is not known to GW 110. Note also that since each UE 101 receives the same G_RAND and has $K_G$, each legitimate UE 101 should compute the same value for G_RES.
8. GW 104 compares every received G_RES with the locally stored G_XRES. Furthermore, GW 104 compiles a list of UEs 101 which were successfully authenticated, as well as a list with those which were not (step 495).
9. GW 104 sends the two lists to SGSN 110 (step 496). Clearly, this message is expected to occupy much less bandwidth than in the cases of C1, C2 and C3, since the two lists delivered by GW are of reduced size now. Alternatively, GW 104 may omit sending one of the lists. By examining only one of the lists, SGSN 110 can derive a conclusion about which UEs 101 were successfully authenticated.
10. GW 104 informs each UE 101 with the result of the authentication (step 497). If all UEs 101 were successfully authenticated, GW 104 will simply broadcast a "success" message to all UEs 101. Otherwise, GW 104 will: (i) broadcast a success message containing information about which UEs 101 were successfully authenticated; and (ii) broadcast an error message containing information about which UEs 101 were not verified, along with the reason of failure. Alternatively, the "success" message may be omitted; UEs 101 that were successfully authenticated could become aware of the successful authentication by examining whether their ID is included in the error broadcast message. Each UE 101 individually acknowledges the reception of the broadcast message to GW 104, which forwards a common acknowledgment message to SGSN 110.

11. Each UE, 101 that was successfully authenticated will compute $CK_i$ and $IK_i$, using the individual $K_i$ key (which is different from $K_G$) and, in addition, $MTC\_CK_i$ and $MTC\_IK_i$ are calculated (step 498) as follows:

$$MTC\_CK_i = CK_i \text{ XOR } CK_G$$

$$MTC\_IK_i = IK_i \text{ XOR } IK_G$$

where:
  $CK_G = f_3(K_G, G\_RAND)$, $IK_G = f_4(K_G, G\_RAND)$
  $CK_i = f_3(K_i, G\_RAND)$, $IK_i = f_4(K_i, G\_RAND)$ C5. GW Trusts the Devices and Registers them as a Group The bandwidth requirements of the authentication protocol can be even further reduced in cases where GW already trusts the associated devices, i.e., the devices and GW operate within a common, mutually trusted environment. For example, the communication link between GW and each device is part of a trusted local area network. In addition, GW is aware of $K_G$ and is trusted by SGSN/HSS. Hence, in this case GW responds to SGSN/HSS with a message containing G_RES, calculated using G_RAND (send by SGSN/HSS to GW) and $K_G$. By sending G_RES, GW notifies SGSN/HSS that all devices belonging to the particular group have been successfully authenticated. Given that SGSN/HSS maintains a mapping table of the form <device ID-Group ID>, SGSN/HSS is informed about the successful authentication of each of the devices in the particular group. Since HSS knows $K_G$ as well as $K_i$, $MTC\_CK_i$ and $MTC\_IK_i$ can be generated as per subsection C4. SGSN/HSS sends a group registration verification message to GW. GW includes G_RAND into this message and broadcasts the message to all devices of the group. With this, each device uses G_RAND, $K_G$ and $K_i$ to compute $MTC\_CK_i$ and $MTC\_IK_i$ as per subsection C4.

D. Individual and Multicast IP Address Assignment to the UEs Belonging to the Group of Interest (Framework Module 208 in FIG. 2)

Figure 5:
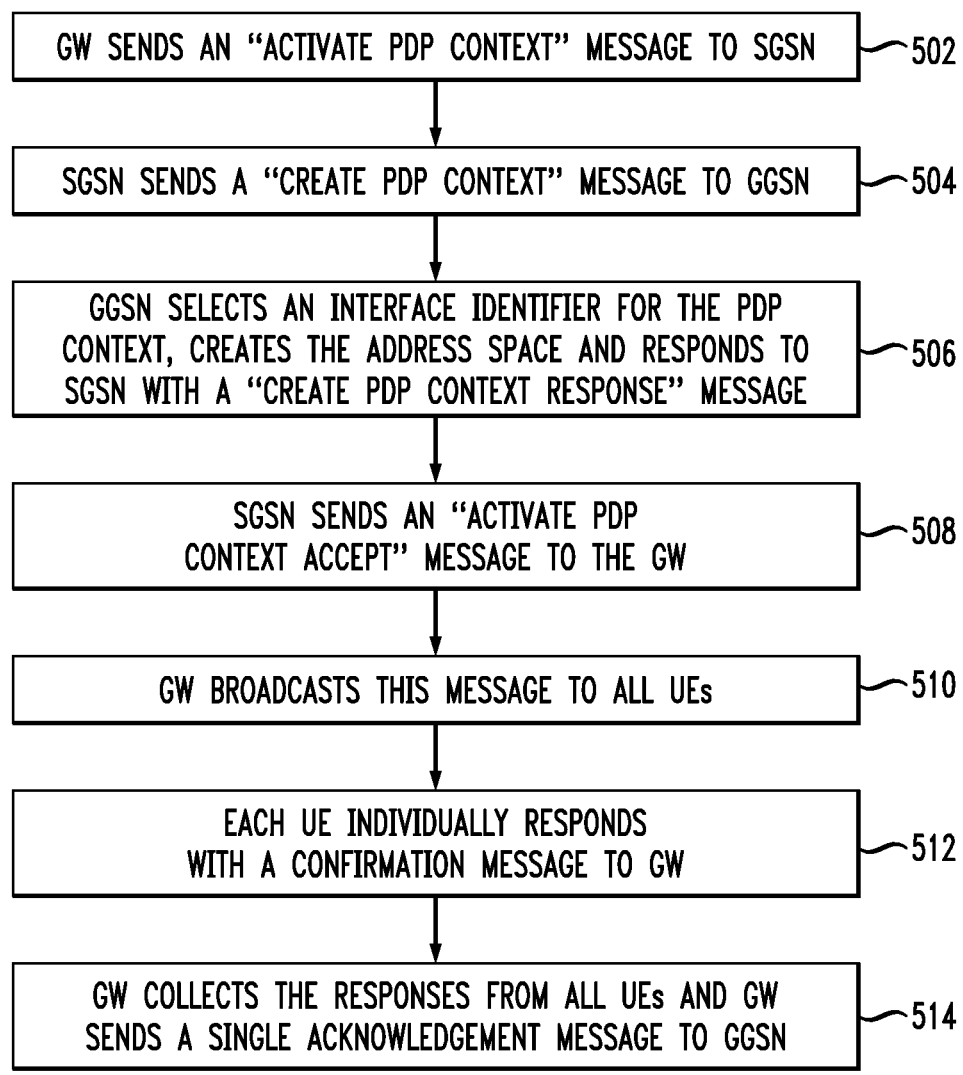
FIG. 5 is a flow diagram illustrating an IP address assignment procedure according to an embodiment of the invention.

In order for a UE 101 to be able to establish traffic session(s) with the M2M application server 108, a routable IP address needs to be assigned to the UE 101 first. For this, the UE 101 has to establish a PDP (Packet Data Protocol) context with GGSN 110. Given that a very large number of UEs 101 may be connected to a single GW 104, having each UE 101 negotiate a PDP context with the 3GPP core network is too intensive in terms of overhead. Therefore, with our framework, GW 104 is responsible for performing these negotiations on behalf of the UEs 101. More specifically, the steps of IP address assignment procedure 500 are shown in FIG. 5 and are as follows:

1. GW 104 sends an "activate PDP context" message to SGSN 110 (step 502). This message includes the group ID and the PDP type. It also includes the same parameters as those used for PDP activation of individual 3GPP UEs in UMTS.
2. SGSN 110 sends a "create PDP context" message to a Gateway GPRS Support Node (GGSN), including the above parameters (step 504). Note that while a GGSN is not specifically shown in FIG. 1, it is known that a GGSN is connected to a SGSN and is responsible for the interworking between the GPRS network and external packet switched networks, such as the Internet.
3. GGSN selects an interface identifier for the PDP context, creates the address space and responds to SGSN 110 with a "create PDP context response" message (step 506). This message includes: (a) the PDP addresses of all UEs 101 that are attached to GW 104; and (b) a group multicast address, which corresponds to the group ID.
4. SGSN 110 sends an "activate PDP context accept" message to the GW 104, which includes the assigned IP addresses for all UEs 101 as well as a multicast address corresponding to the group (step 508).
5. GW 104 broadcasts this message to all UEs 101 (step 510). This message is encrypted using $CK_G$ and integrity protected using $IK_G$.
6. Each UE 101 individually responds with a confirmation message to GW (step 512) UEs 101 will not send router solicitation messages to GGSN, since GW 104 is already aware of such information. Similarly, GGSN will not send any router advertisements to the group of UEs 101. Such an advertisement was sent by GGSN to GW 104 during the registration of the latter.
7. GW 104 collects the responses from all UEs 101 (step 514). Subsequently, GW 104 sends a single acknowledgement message to GGSN.

E. Group Registration, Authentication and Key Agreement with the M2M Application Server (Framework Module 210 in FIG. 2)

After all UEs 101 have been assigned their IP addresses, they are able to reach the M2M application server 108 via a routable path, potentially through the Internet. Devices need to first register at the service layer with this server before accessing the M2M application services. One goal of techniques of the invention is to provide a mechanism for registering a group of devices with the M2M application server in a lightweight manner, i.e., without the need to individually register each device. While different network and security protocols may be adopted for the registration of an M2M device at the service layer (such as AKA, TLS-PSK, etc), our framework is able to adapt to any of those protocols with very trivial adjustments, or even be applied without any modifications.

Figure 6A:
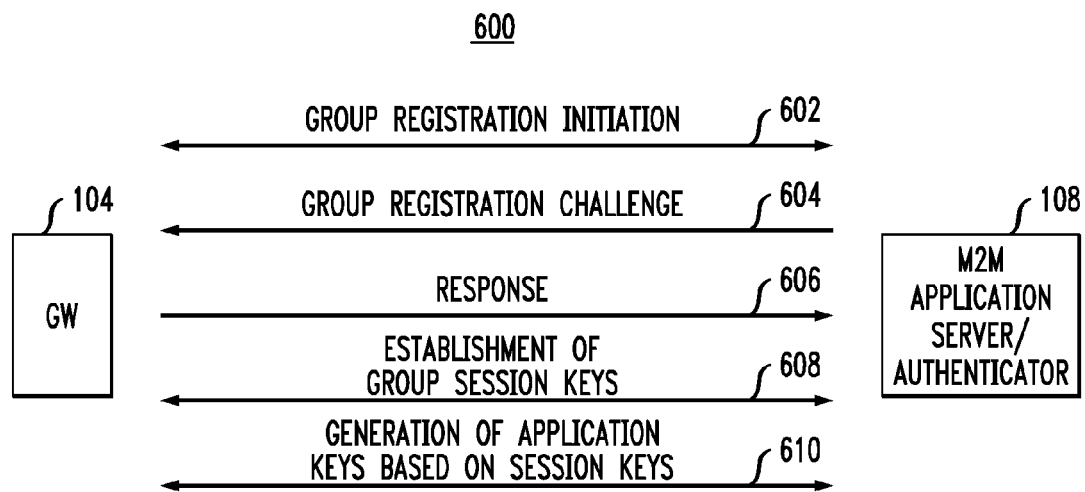
FIG. 6A is a flow diagram illustrating a group registration, authentication and key agreement protocol according to an embodiment of the invention.

In one embodiment, the inventive technique for service layer registration is motivated by two service layer security requirements: (a) the M2M server 108 needs to authenticate the M2M device 101 as a client entity; and (b) given that the M2M server 108 may facilitate multiple M2M applications, each application that runs locally on the M2M device 101 and wishes to access the network services needs to use different security credentials than every other application. Given these requirements, the inventive framework performs group registration, authentication and key agreement protocol 600 using the following generic steps, as depicted in FIG. 6A:

1. The procedure is initiated by either GW 104, or an authentication entity (e.g., M2M application server 108) which will validate the authenticity of the UEs 101 (step 602).
2. The authentication entity identifies the devices that constitute the group and sends a set of authentication parameters to GW 104 for challenging the UEs 101 (step 604).
3. GW 104 broadcasts the challenge to all UEs 101 and receives their responses. Furthermore, GW 104 forwards the responses to the authentication entity (step 606). Again, the authentication entity could be the M2M application server 108 or another authenticator that will validate the responses.

4. After validation, individual session keys as well as a common session key are established by all involved entities (step 608).
5. Application layer key material is generated from these session keys (step 610). Such application layer keys can be used for securing the data traffic involved with each application, such as for the case of HTTPS with TLS-PSK, which requires the existence of a pre-shared key, see U. Blumenthal and P. Goel, "Preshared Key (PSK) Ciphersuites with NULL Encryption for Transport Layer Security (TLS)," RFC 4785, the disclosure of which is incorporated by reference herein in its entirety).

Figure 6B:
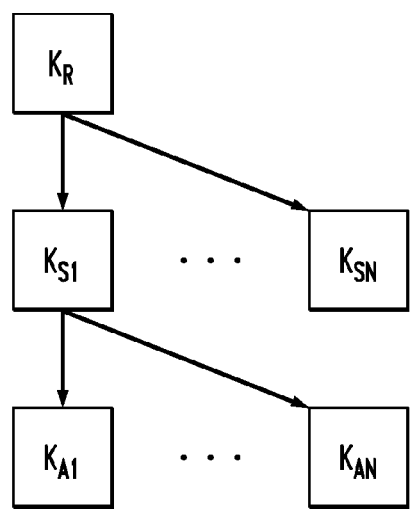
FIG. 6B is a block diagram illustrating a key hierarchy according to an embodiment of the invention.

Clearly, these steps can be easily integrated with any registration/authentication protocol. Our generic scheme assumes that each M2M UE has been already provisioned with a unique, permanent root key $K_R$ and with a common group root key $K_{GR}$, similarly as in subsection C for the case of access network registration. As described above, these keys are then used for generating session and application keys, as per the key hierarchy 612 depicted in FIG. 6B. As an example, the permanent root key and the common group root key are both provisioned to the M2M UE prior to initial service group registration. At every service registration procedure, the M2M UE is authenticated by proving knowledge of these keys; Note that during individual registration, only the root key $K_R$ is used for authenticating the M2M UE, while for group authentication, the group root key $K_{GR}$ is used. Service session keys ($K_S$) are generated as a result of successful authentication, through the use of both $K_R$ and $K_{GR}$. Service session keys are renewed with every new registration. Such keys are further used for deriving application keys ($K_A$), which are utilized by security functions for integrity protection and encryption of the application data traffic.

Figure 6C:
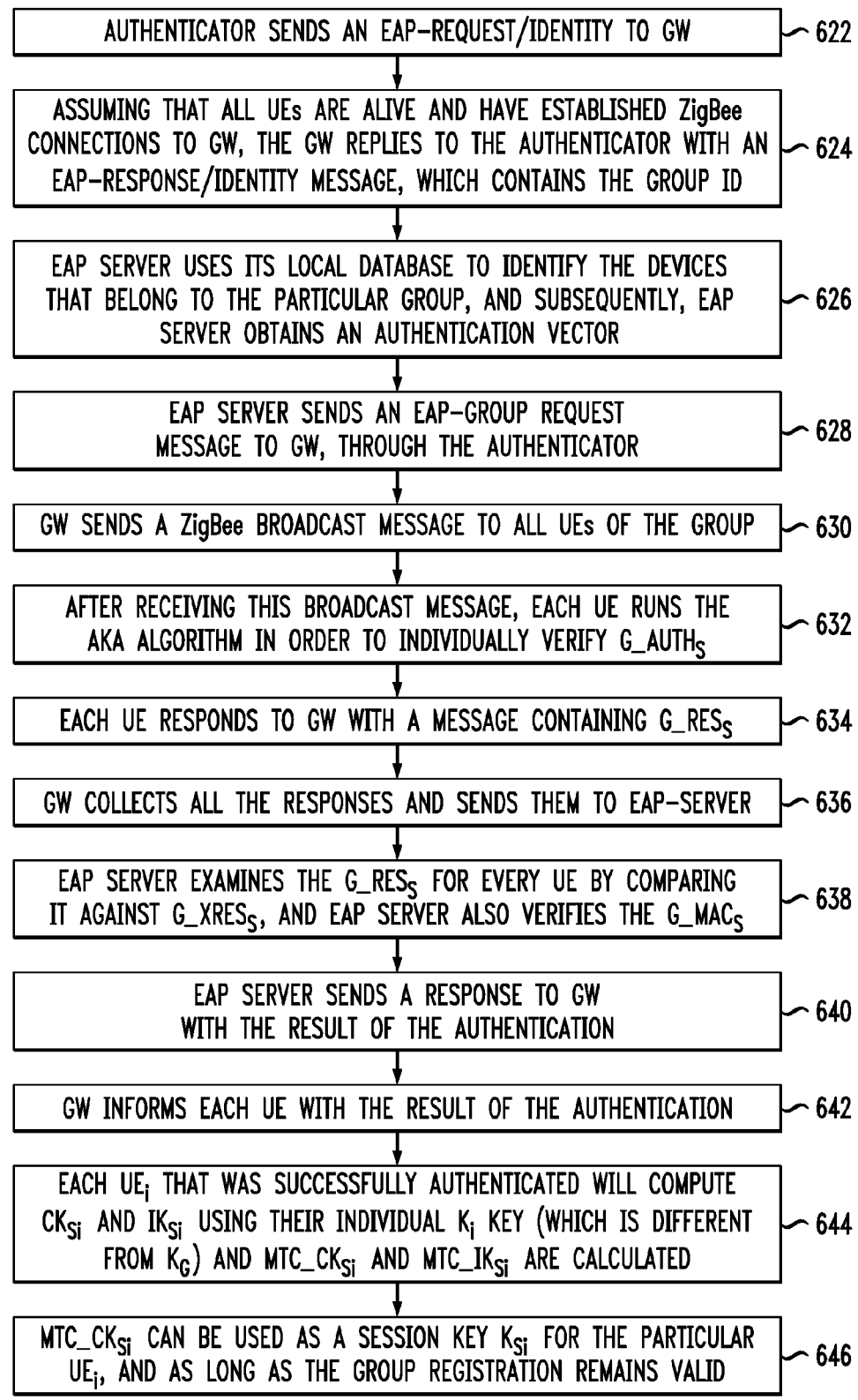
FIG. 6C is a flow diagram illustrating a service layer group registration protocol according to an embodiment of the invention.

In what follows, we provide an example (use-case) of how our service layer group registration protocol can be realized for the case where EAP-AKA is used. Here, we assume that the authentication entity (authenticator) is a distinct entity, which communicates with a backend EAP server. Their interactions are not discussed here for the sake of simplicity. Protocol 620 in FIG. 6C includes the following steps:

1. The authenticator sends an EAP-Request/Identity to GW 104 (step 622).
2. Assuming that all UEs 101 are alive and have established ZigBee connections to GW 104, the GW 104 replies to the authenticator with an EAP-response/Identity message, which contains the group ID (step 624).
3. The EAP server uses its local database to identify the devices that belong to the particular group (step 626). Subsequently, the EAP server obtains an authentication vector, based on: (a) the provisioned individual root key $K_R$ in each UE 101; and (b) the common group root key $K_{GR}$, also known to each UE 101. Each obtained vector is of the form: V={G_AUTN$_S$, G_RAND$_S$, G_XRES$_S$, [MTC_CK$_{Si}$, MTC_IK$_{S1}$], . . . , [MTC_CK$_{SN}$, MTC_IK$_{SN}$]}
4. The EAP server sends an EAP-group request message to GW 104, through the authenticator (step 628). This message includes the G_RAND$_S$, the G_AUTN$_S$ and G_MAC$_S$, i.e., a message authentication code that covers the EAP packet, see, e.g., J. Arkko and H. Haverinen, "Extensible Authentication Protocol Method for 3$^{rd}$ Generation Authentication and Key Agreement (EAP-AKA)," the disclosure of which is incorporated by reference herein in its entirety.
5. GW 104 sends a ZigBee broadcast message to all UEs 101 of the group, containing the above three parameters (step 630). This message is encrypted with $K_{ZB}$, as per the ZigBee standard.
6. After receiving this broadcast message, each UE 101 runs the AKA algorithm in order to individually verify G_AUTN$_S$ (step 632).
7. Each UE 101 responds to GW 104 with a message containing G_RES$_S$ (step 634). The value of G_RES$_S$ is computed using the provisioned $K_{GR}$ key. Recall that this key is only known to UEs and to EAP server. Moreover, since each UE 101 receives the same G_RAND$_S$ and has $K_{GR}$, each legitimate UE 101 should compute the same value for G_RES$_S$.
8. GW 104 collects all the responses and sends them to EAP server (through the authenticator) in an EAP-group response message (step 636). This message also includes a G_MAC$_S$.
9. EAP server examines the G_RES$_S$ for every UE 101 by comparing it against G_XRES$_S$. The server also verifies the G_MAC$_S$ (step 638).
10. EAP server sends a response to GW 104 with the result of the authentication (step 640).
11. GW 104 informs each UE 101 with the result of the authentication (step 642). If all UEs were successfully authenticated, GW will simply broadcast a "success" message to all UEs. Otherwise, GW will: (i) broadcast a success message containing information about which UEs were successfully authenticated; and (ii) broadcast an error message containing information about which UEs were not verified, along with the reason of failure. Alternatively, the "success" message may be omitted; UEs that were successfully authenticated could become aware of the successful authentication by examining whether their ID is included in the error broadcast message. Each UE individually acknowledges the reception of the broadcast message to GW, which forwards a common acknowledgment message to the authenticator.
12. Each UE$_i$ 101 that was successfully authenticated will compute CK$_{Si}$ and IK$_{Si}$ using their individual $K_i$ key (which is different from $K_G$) and, in addition, MTC_CK$_{Si}$ and MTC_IK$_{Si}$ are calculated (step 644) as follows:

MTC_CK$_{Si}$=CK$_{Si}$ XOR CK$_{GR}$

MTC_IK$_{Si}$=IK$_{Si}$ XOR IK$_{GR}$ where:
    CK$_{GR}$=f$_3$(K$_G$, G_RAND$_S$), IK$_{GR}$=f$_4$(K$_{GR}$, G_RAND$_S$)
    CK$_{Ri}$=f$_3$(K$_R$, G_RAND$_S$), IK$_{Si}$=f$_4$(K$_R$, G_RAND$_S$)
13. MTC_CK$_{Si}$ can be used as a session key $K_{Si}$ for the particular UE$_i$, and as long as the group registration remains valid (step 646). From this key, any number of application keys $K_A$ (running locally in the UE) can be derived (see, e.g., FIG. 6B), as per 3GPP TS 33.102, by both the UE and the authenticator. Since with every new registration a new session key is derived, all application layer keys are renewed at each new group registration.

F. Relaxation to Design Assumption (7)

In subsection II, we stated the assumption (7) that the link between UE and GW is potentially encrypted. This assumption can be relaxed by assuming that G_RES is computed by each UE using the UE's unique identifier (e.g., IMSI for the case of UMTS) in addition to $K_G$. With this, the value of G_RES is different for each UE.

IV. Illustrative Computing System

Figure 7:
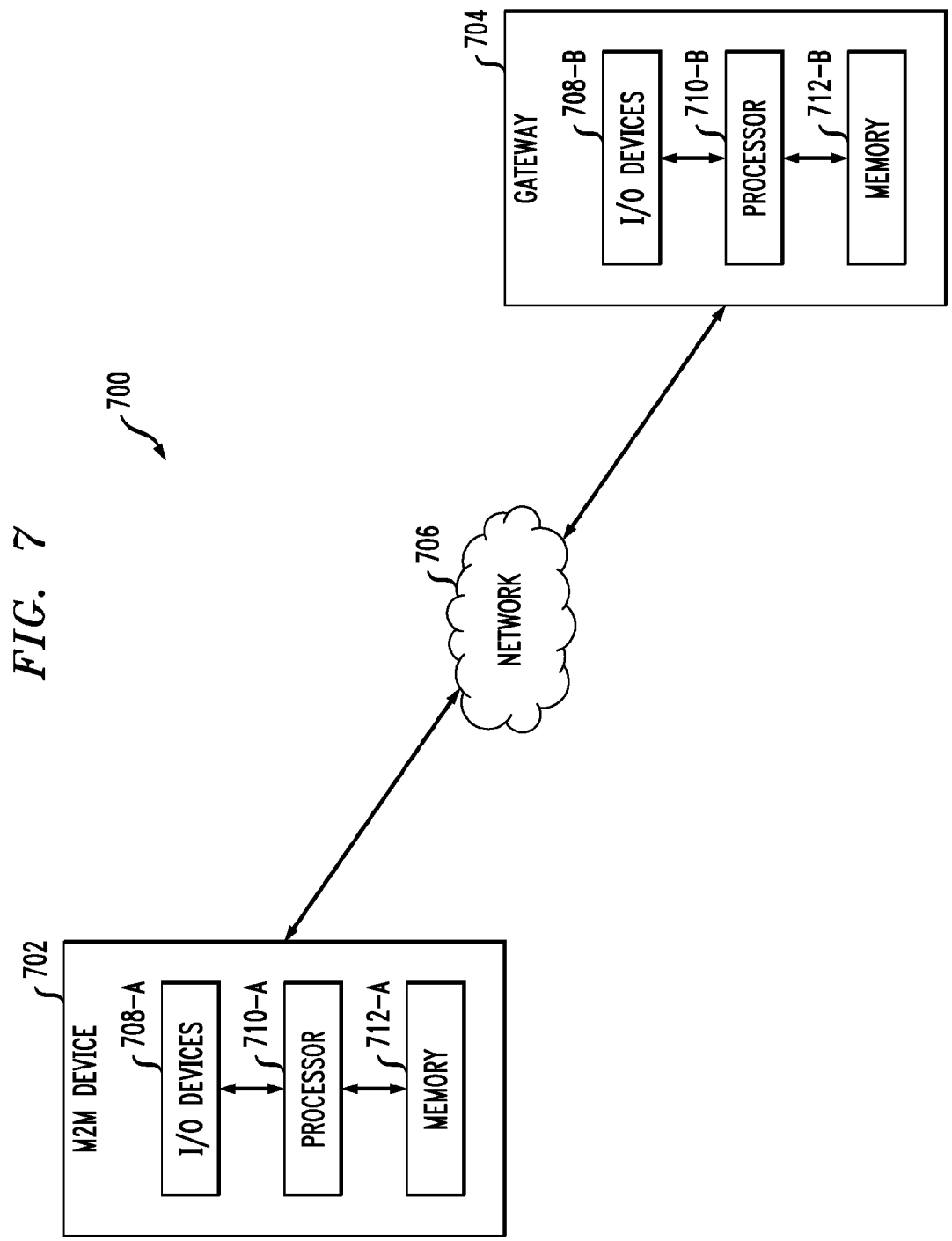
FIG. 7 is a block diagram illustrating a generalized hardware architecture of a data network and communication devices suitable for implementing one or more of the protocols according to embodiments of the invention.

FIG. 7 illustrates a generalized hardware architecture 700 of a network environment and communication devices (users) in the form of computing systems suitable for implementing an secure registration protocol between multiple entities (open devices such as an M2M devices 101, and a gateway server such as GW 104) according to the present invention. As illustratively shown, M2M device (a communication device) comprises a computing system 702, while the gateway server (a network device) comprises a computing system 704. The two computing systems 702 and 704 are coupled via a network 706. The network may be any network across which M2M device and the GW server are able to communicate, for example, as in the embodiments described above, the network 706 could include a publicly-accessible wide area communication network such as a cellular communication network operated by a network operator (e.g., Verizon, AT&T, Sprint). However, the invention is not limited to a particular type of network. Typically, M2M device could be a client machine and the GW server could be a server machine. Also, both could be clients or both could be servers. Further, a client could be interfacing a user. Thus, it is to be understood that the communication protocol of the present invention is not limited to the case where the computing systems are client and server, respectively, but instead is applicable to any computing devices comprising the two network elements.

Thus, it is understood that the architecture of FIG. 7 depicts two participants in the protocols of FIG. 4A through 6C. It is to be appreciated that similar computing systems (communication devices and network devices) would be used to realize an implementation of the other participants in the protocols, e.g., NodeB 106, application server 108, SGSN 110, and HSS 112. For the sake of simplicity, all the computing systems (communication devices and network devices) that may participate in the protocols of the invention are not shown in FIG. 7.

As would be readily apparent to one of ordinary skill in the art, the servers and clients may be implemented as programmed computing system operating under control of program code. The program code would be stored in a computer readable storage medium (e.g., a memory) and the code would be executed by a processor of the computing system. The servers and clients may alternatively each be implemented as one or more Application Specific Integrated Circuits (ASICs). The ASIC could access and load the program code or the program code could be stored on the ASIC. Given this disclosure of the invention, one skilled in the art could readily produce appropriate program code in order to implement the protocols described herein.

Nonetheless, FIG. 7 generally illustrates an exemplary architecture for each computing system communicating over the network. As shown, M2M device 702 comprises I/O devices 708-A, processor 710-A, and memory 712-A. GW server 704 comprises I/O devices 708-B, processor 710-B, and memory 712-B. It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU.

Advantageously, as has been illustratively described above, principles of the invention provide a framework (and methods) that allow multiple clients/devices (users) to securely register with the same server/network using one set of registration procedures. In effect, we develop a framework and detailed protocols to solve the "reverse single sign-on" problem. One main advantage of our framework is that it allows multiple client devices (users) to register with the network as a "group," but yet generate individual session keys with the network. With this, the process of authenticating a large number of devices (users) is greatly simplified; both the complexity and the bandwidth requirements of the authentication procedure are reduced to a large extent. With a view towards simplifying the exposition, we describe how our security framework can be applied for performing group authentication and key agreement with applications to Machine-to-Machine Communications (M2M) (also known as Machine Type Communications or MTC). While M2M is one suitable area of application, our framework is general enough to address other applications as well, where group registration makes sense.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for registering a group of two or more communication devices in a communication network, comprising:
    sending, from a network device, a group challenge message to the group of two or more communication devices;
    receiving, at the network device, two or more response messages to the group challenge respectively from two or more of the group of two or more communication devices, wherein the response message from each of the responding communication devices in the group comprises a same group credential corresponding to the group;
    aggregating, at the network device, the response messages to the group challenge received from the communication devices in the group; and
    sending, from the network device, an aggregate message to an authenticator in the communication network to mutually authenticate, as a group, at least two of the communication devices with the authenticator to establish an individual session key for each of said at least two communication devices.

2. The method of claim 1, wherein the group challenge message is broadcast by the network device.

3. The method of claim 1, wherein the network device comprises an authentication server.

4. The method of claim 1, wherein the network device comprises a gateway entity.

5. The method of claim 1, wherein the network device comprises a base station.

6. The method of claim 1, wherein the group credential comprises a group key.

7. The method of claim 1, wherein group registration is secure via mutual authentication between the communication devices of the group and the network device using an agreed upon key.

8. The method of claim 1, wherein the group credentials are provisioned prior to the registration method being performed, and the group credentials are the same for each of the two or more communication devices in the group.

9. The method of claim 8, wherein the group credentials are provisioned to each communication device or to the network device.

10. The method of claim 1, wherein the two or more communication devices in the group are grouped together based on a given policy.

11. The method of claim 1, further comprising performing a mutual authentication between the network device and the communication network prior to the registration of the two or more communication devices.

12. The method of claim 11, wherein the mutual authentication comprises the network device performing an authentication and key agreement procedure with a gateway support node of the communication network.

13. The method of claim 1, wherein the network device establishes a communication connection with each of the two or more communication devices in the group.

14. The method of claim 13, wherein the step of establishing the communication connection between the network device and each of the two or more communication devices in the group further comprises the network device receiving an activation message for the group from an application server of the communication network such that the network device can identify the communication devices that belong to the given group and establish the communication connection therewith.

15. The method of claim 13, wherein the step of establishing the communication connection between the network device and each of the two or more communication devices in the group further comprises each of the communication devices self-activating and establishing the communication connection with the network device.

16. The method of claim 13, wherein one of the communication devices of the group establishes a communication connection with the network device and then deactivates such that reactivation and authentication can be performed at a later time.

17. The method of claim 13, wherein the network device establishes the communication connection with a subset of the communication devices in the group and waits, for a given time period, to receive response messages from all the communication devices in the group before authentication proceeds.

18. The method of claim 13, wherein the communication connection is established using an unlicensed communication spectrum.

19. The method of claim 1, wherein all of the communication devices in the group are mutually authenticated with the authenticator, as a group.

20. The method of claim 1, wherein the authenticator is a gateway support node in the communication network.

21. The method of claim 1, wherein the authenticator is a subscriber server in the communication network.

22. The method of claim 1, wherein the authenticator is an application server in the communication network.

23. The method of claim 1, wherein the group credentials are unknown to the network device.

24. The method of claim 1, wherein the network device authenticates the communication devices in the group.

25. The method of claim 1, further comprising the step of the network device obtaining address assignments for the two or more communication devices in the group.

26. The method of claim 25, wherein the address assignments comprise an individual network address for each communication device in the group and a multicast network address corresponding to the group.

27. The method of claim 1, wherein, once each communication device of the group is authenticated, the communication device establishes a data session with an application server.

28. The method of claim 1, wherein, once each communication device of the group is authenticated, the individual session key is established for that communication device of the group.

29. The method of claim 28, wherein a group session key is established for the group.

30. The method of claim 29, wherein respective application keys are generated from the session keys.

31. Apparatus for use in registering a group of two or more communication devices in a communication network, comprising:
  a memory associated with a network device; and
  a processor associated with the network device, coupled to the memory, and configured to:
    send a group challenge message to the group of two or more communication devices;
    receive two or more response messages to the group challenge respectively from two or more of the group of two or more communication devices, wherein the response message from each of the responding communication devices in the group comprises a same group credential corresponding to the group;
    aggregate the response messages to the group challenge received from the communication devices in the group; and
    send an aggregate message to an authenticator in the communication network to mutually authenticate, as a group, at least two of the communication devices with the authenticator to establish an individual session key for each of said at least two communication devices.

32. A method for registering a group of two or more communication devices in a communication network, comprising:
  receiving, at a given one of the communication devices of the group, a group challenge message sent by a network device to the group of two or more communication devices;
  sending, from the given one of the communication devices of the group to the network device, a response message to the group challenge, such that the network device receives respective response messages from two or more of the group of two or more communication devices, and wherein the response message from each of the responding communication devices in the group comprises a same group credential corresponding to the group; and
  mutually authenticating, as a group with at least one other communication device, to an authenticator in the communication network using an aggregate message sent from the network device to the authenticator to establish an individual session key for the given one of the communication devices and said at least one other communication device, the aggregate message comprising the respective response messages to the group challenge from the group of communication devices.

33. Apparatus for use in registering a group of two or more communication devices in a communication network, comprising:

a memory associated with a given one of the communication devices of the group; and a processor associated with the given one of the communication devices of the group, coupled to the memory, and configured to:

receive a group challenge message sent by a network device to the group of two or more communication devices;

send, to the network device, a response message to the group challenge, such that the network device receives respective response messages from two or more of the group of two or more communication devices, and wherein the response message from each of the responding communication devices in the group comprises a same group credential corresponding to the group; and mutually authenticate, as a group with at least one other communication device, to an authenticator in the communication network using an aggregate message sent from the network device to the authenticator to establish an individual session key for the given one of the communication devices and said at least one other communication device, the aggregate message comprising the respective response messages to the group challenge from the group of communication devices.

34. A method for registering a group of two or more users in a communication network, comprising:

sending, from a network device, a group challenge message to the group of two or more users;

receiving, at the network device, two or more response messages to the group challenge respectively from two or more of the group of two or more users, wherein the response message from each of the responding users in the group comprises a same group credential corresponding to the group;

aggregating, at the network device, the response messages to the group challenge received from the users in the group; and sending, from the network device, an aggregate message to an authenticator in the communication network to mutually authenticate, as a group, at least two of the users with the authenticator to establish an individual session key for each of said at least two users.

* * * * *